US007802087B2

(12) United States Patent  (10) Patent No.: US 7,802,087 B2
Gatto et al.  (45) Date of Patent: Sep. 21, 2010

(54) UNIVERSAL METHOD FOR SUBMITTING GAMING MACHINE SOURCE CODE SOFTWARE TO A GAME CERTIFICATION LABORATORY

(75) Inventors: Jean-Marie Gatto, London (GB); Thierry Brunet de Courssou, Henderson, NV (US)

(73) Assignee: IGT, Reno, NV (US)

( * ) Notice: Subject to any disclaimer, the term of this patent is extended or adjusted under 35 U.S.C. 154(b) by 1286 days.

(21) Appl. No.: 11/251,628

(22) Filed: Oct. 14, 2005

(65) Prior Publication Data

US 2006/0122937 A1 Jun. 8, 2006

(51) Int. Cl.
 *G06F 9/00* (2006.01)
 *G06F 9/24* (2006.01)
 *G06F 15/177* (2006.01)
 *G06F 1/24* (2006.01)
 *G06F 21/00* (2006.01)
 *G06F 17/00* (2006.01)
 *G06F 19/00* (2006.01)
 *A63F 9/24* (2006.01)
 *A63F 13/00* (2006.01)

(52) U.S. Cl. ............................ 713/100; 713/1; 705/51; 463/29

(58) Field of Classification Search ................... 705/51; 713/1, 26, 100; 463/29
See application file for complete search history.

(56) References Cited

U.S. PATENT DOCUMENTS 5,265,874 A 11/1993 Dickinson et al.
5,290,033 A 3/1994 Bittner et al.

5,671,412 A 9/1997 Christiano (Continued)

FOREIGN PATENT DOCUMENTS

WO 0072119 A2 11/2000

(Continued)

OTHER PUBLICATIONS

International Search Report and Written Opinion of the International Searching Authority in related PCT application PCT/US08/60899, mailed Aug. 22, 2008.

(Continued)

*Primary Examiner*—Kambiz Zand
*Assistant Examiner*—Benjamin A Kaplan
(74) *Attorney, Agent, or Firm*—Young Law Firm, P.C.

(57) ABSTRACT

A universal computer-implemented method for submitting source code to an authorized game certification laboratory. Initial source code and subsequent source code patches may be transferred from the manufacturer's software development environment into the laboratory's software development environment in a controlled fashion using packaging installation technology normally used for deploying software applications. The packaging technology contains automation actions for automating the synchronization and/or management of the source code and related files between the two software development environments. The entirety of the source code or any source code patch sequence may be removed by executing the corresponding uninstall function. The package containing the original source code or the source code patch sequences and related files may be code signed such as to provide persistent proof of origin which may be verified at any time. The method may be implemented under any operating system such as Microsoft Windows, Linux, UNIX and Apple Mac OS without the laboratory having to learn a complex source code configuration management software.

96 Claims, 21 Drawing Sheets

U.S. PATENT DOCUMENTS

| | | | | |
|---|---|---|---|---|
| 5,715,456 | A | * | 2/1998 | Bennett et al. .................. 713/2 |
| 5,823,879 | A | | 10/1998 | Goldberg et al. |
| 5,841,870 | A | | 11/1998 | Fieres et al. |
| 5,920,861 | A | | 7/1999 | Hall et al. |
| 5,978,855 | A | | 11/1999 | Metz et al. |
| 6,048,269 | A | | 4/2000 | Burns et al. |
| 6,077,163 | A | | 6/2000 | Walker et al. |
| 6,161,218 | A | * | 12/2000 | Taylor ........................ 717/174 |
| 6,210,274 | B1 | | 4/2001 | Carlson |
| 6,381,742 | B2 | * | 4/2002 | Forbes et al. ................. 717/176 |
| 6,428,413 | B1 | | 8/2002 | Carlson |
| 6,471,068 | B1 | | 10/2002 | Kido et al. |
| 6,682,423 | B2 | | 1/2004 | Brosnan et al. |
| 6,697,824 | B1 | * | 2/2004 | Bowman-Amuah ......... 709/229 |
| 6,697,948 | B1 | | 2/2004 | Rabin et al. |
| 6,749,510 | B2 | | 6/2004 | Giobbi |
| 6,862,696 | B1 | * | 3/2005 | Voas et al. ..................... 714/38 |
| 6,976,252 | B2 | * | 12/2005 | White et al. ................ 717/174 |
| 7,152,158 | B2 | | 12/2006 | Watanabe et al. |
| 7,222,341 | B2 | * | 5/2007 | Forbes et al. ................. 717/170 |
| 7,438,643 | B2 | | 10/2008 | Brosnan et al. |
| 2001/0029205 | A1 | | 10/2001 | Taho et al. |
| 2001/0029605 | A1 | * | 10/2001 | Forbes et al. ................... 717/11 |
| 2001/0047348 | A1 | | 11/2001 | Davis |
| 2002/0026581 | A1 | | 2/2002 | Matsuyama et al. |
| 2002/0068631 | A1 | | 6/2002 | Raverdy et al. |
| 2002/0099952 | A1 | | 7/2002 | Lambert |
| 2002/0104097 | A1 | | 8/2002 | Jerding et al. |
| 2002/0116615 | A1 | | 8/2002 | Nguyen et al. |
| 2002/0137217 | A1 | | 9/2002 | Rowe |
| 2002/0147040 | A1 | | 10/2002 | Walker et al. |
| 2002/0188941 | A1 | * | 12/2002 | Cicciarelli et al. .......... 717/175 |
| 2002/0197528 | A1 | * | 12/2002 | Zunke ........................ 429/144 |
| 2003/0033255 | A1 | | 2/2003 | Burton et al. |
| 2003/0211881 | A1 | | 11/2003 | Walker et al. |
| 2003/0225929 | A1 | * | 12/2003 | Adams ........................ 709/321 |
| 2004/0034724 | A1 | | 2/2004 | Bruner et al. |
| 2004/0039911 | A1 | | 2/2004 | Oka et al. |
| 2004/0198496 | A1 | | 10/2004 | Gatto et al. |
| 2005/0154824 | A1 | | 7/2005 | Bruner et al. |
| 2005/0282637 | A1 | | 12/2005 | Gatto et al. |
| 2006/0035713 | A1 | | 2/2006 | Cockerille |
| 2006/0046819 | A1 | | 3/2006 | Nguyen |
| 2006/0046824 | A1 | | 3/2006 | Silva |
| 2006/0100010 | A1 | * | 5/2006 | Gatto et al. .................... 463/29 |
| 2007/0048714 | A1 | | 3/2007 | Plastina et al. |

FOREIGN PATENT DOCUMENTS

| | | |
|---|---|---|
| WO | 0225409 A2 | 3/2002 |
| WO | WO 2004/080550 A2 | 9/2004 |

OTHER PUBLICATIONS

Office Action mailed Mar. 29, 2006, in parent U.S. Appl. No. 10/789,975, filed Feb. 27, 2004.
Final Office Action mailed Oct. 11, 2006, in parent U.S. Appl. No. 10/789,975, filed Feb. 27, 2004.
Office Action mailed Jun. 13, 2006, in parent U.S. Appl. No. 11/138,736, filed May 25, 2005.
Final Office Action mailed May 13, 2008, in parent U.S. Appl. No. 10/789,975, filed Feb. 27, 2004.
Office Action mailed May 13, 2008, in related U.S. Appl. No. 11/277,026, filed Mar. 20, 2006.
International Search Report mailed Feb. 28, 2008, in related International Application No. PCT/US07/81574, filed Feb. 2, 2007.
Written Opinion of the International Searching Authority mailed Feb. 28, 2008, in related International Application No. PCT/US07/81574, filed Feb. 2, 2007.
Office Action mailed Oct. 19, 2007, in related U.S. Appl. No. 10/789,975, filed Feb. 27, 2004.
Notice of Allowance mailed Nov. 21, 2007, in related U.S. Appl. No. 11/138,736, filed May 25, 2005.
International Search Report dated Mar. 30, 2007, in related International Application No. PCT/US06/35560, filed Sep. 12, 2006.
Written Opinion dated Mar. 30, 2007, in related International Application No. PCT/US06/35560, filed Sep. 12, 2006.
International Search Report dated Apr. 20, 2007, in related International Application No. PCT/US06/10926, filed Mar. 24, 2006.
Written Opinion dated Apr. 20, 2007, in related International Application No. PCT/US06/10926, filed Mar. 24, 2006.
International Preliminary Report on Patentability dated Jun. 5, 2007, in related International Application No. PCT/US04/06045, filed Feb. 27, 2004.
Office Action mailed Jun. 27, 2007 in related U.S. Appl. No. 11/138,736, filed May 25, 2005.
International Search Report mailed Sep. 19, 2007, in related International Application No. PCT/US06/12043, filed Mar. 31, 2006.
Written Opinion of the International Searching Authority mailed Sep. 19, 2007, in related International Application No. PCT/US06/12043, filed Mar. 31, 2006.
Notice of Allowance mailed Nov. 21, 2007, in related U.S. Appl. No. 11/138,736, filed May 25, 2005.
Office Action of Jan. 4, 2010 in related U.S. Appl. No. 11/761,370.
Supplementary European Search Report in related EP Application EP04715742.5, Date: Nov. 30, 2009.
MSDN Library, "RefreshPolicy" (downloaded on Feb. 19, 2004).
MSDN Library, "RegisterGPNotification" (downloaded on Feb. 12, 2004).
MSDN Library, "RefreshPolicyEx" (downloaded on Feb. 12, 2004).
Microsoft TechNet, MSIEXE command at http://www.microsoft.com/technet/prodtechnol/winxppro/ proddocs/msiexec.asp (downloaded on Feb. 16, 2004).
Microsoft Next-Generation Secure Computing Base ("NGSCB") (downloaded on Feb. 16, 2004).
Microsoft Corporation, "Designing a Public Key Infrastructure" Chapter 12, Copyright 2001.
Microsoft Corporation, "Using Software Restriction Policies to Protect Against Unauthorized Software" Microsoft Windows XP and Windows.NET Technical Article, pp. 1-50 (Jan. 2002).
M. Myers et al., "Certificate Management Messages over CMS", ftp://ftp.isi.edu/in-notes/rfc2797.txt (Apr. 2000).
R. Housley et al., "Internet X.509 Public Key Infrastructure Certificate and Certificate Revocation List (CRL) Profile", ftp://ftp.isi.edu/in-notes/rfc3280.txt (Apr. 2002).
M. Nystrom et al., "PKCS #10: Certification Request Syntax Specification Version 1.7", ftp://ftp.isi.edu/in-notes/rfc2986.txt (Nov. 2000).
Enterprise News and Reviews, "Microsoft: Why Longhorn Matters", http://www.eweek.com/article2/0,1759,1786193,00.asp, printed Apr. 15, 2005.
Mary Jo Foley, "Microsoft dusts off 'Palladium' security for Longhorn", Microsoft Watch, http://www.microsoft-watch.com/article2/0,1995,1786571,00.asp, printed Apr. 15, 2005.
Paula Rooney, "Ballmer Touts Interop with Sun, Trusted Computing Group", http://www.crn.com/sections/breakingnews/breakingnews.jhtml?articleId=160911712, printed Apr. 20, 2005.
Microsoft Corp., "Microsoft CEO Steve Ballmer Affirms Commitment to Dynamic Systems Initiative", Press Release, printed Apr. 20, 2005.
Sygate Technologies, "Sygate Supports Microsoft and Trusted Computing Group Alignment for Defining Endpoint Enforcement Standards", Press Release, printed Apr. 20, 2005.
Sygate web site, "Policy Enforcement", printed Apr. 20, 2005.
Barbara Darrow and Paula Rooney, "Allchin Talks Turkey About Longhorn", http://www.crn.com/sections/breakingnews/dailyarchives.jhtml;jsessionid=2P2WCO1SRT, printed Apr. 18, 2005.
Microsoft manual, "Windows Installer v3.0 RC1 (MSI3.0)", Published Sep. 2003, Revised Mar. 2004, 27 pgs.
Microsoft manual, Windows Installer v3.0 RC1 Patch Sequencing (Draft Whitepaper), Published Mar. 2004, 51 pgs.
Microsoft manual, "Using Administrative Template Files with Registry-Based Group Policy", Published Sep. 2004, 58 pgs.

Microsoft, "Frequently Asked Questions About Windows Installer", Published Aug. 26, 2002, http://microsoft.com/windows2000/community/centers/management/msi_faq.mspx, printed May 5, 2005.

Microsoft, "How to add a Windows 2000 ADM template to a Group Policy snap-in in Office XP", http://support.microsoft.com/default.aspx?scid=kb;en-us;307732, printed Apr. 15, 2005.

Microsoft, "Using Administrative Template Files with Registry-E Group Policy", published Oct. 11, 2004, 41 pgs, http://www.microsoft.com/technet/prodtechnol/windowsserver2003/technologies/manage . . . , printed Apr. 15, 2005.

International Search Report mailed May 11, 2005, in related International Application No. PCT/US2004/006045, filed Feb. 27, 2005 (3pgs).

Written Opinion mailed May 11, 2005, in related International Application No. PCT/US2004/006045, filed Feb. 27, 2005 (10pgs).

Office Action mailed Jun. 30, 2005, in parent U.S. Appl. No. 10/789,975, filed Feb. 27, 2004 (14pgs).

Gaming Labs Certified, "Standard Series, GLI-21: Server-Based Game Download Systems", Version: 1.3, Release Date: Apr. 29, 2004 (21pgs).

Microsoft, http://msdn.microsoft.com/library/en-us/msi/setup/patching.asp?frame=true, "Patching", printed Oct. 11, 2005 (2pgs).

Microsoft, http://msdn.microsoft.com/library/en-us/msi/setup/custom_actions.asp?frame=true, "Custom Actions", printed Oct. 11, 2005 (1pg).

Office Action of Mar. 30, 2010 in related U.S. Appl. No. 11/090,819.

\* cited by examiner

FIG. 4

| Field | Value |
|---|---|
| Basic Constraints | Subject Type=End Entity, Pat... |
| Certificate Policies | [1]Certificate Policy:Policy Ide... |
| Netscape Cert Type | SSL Client Authentication (80) |
| 2.16.840.1.113733.1.6.7 | 16 04 4e 6f 6e 65 |
| CRL Distribution Points | [1]CRL Distribution Point: Distr... |

FIG. 20

| Component File Name | Part Number | Version | Subject Name for Code-Sign PKI Certificate |
|---|---|---|---|
| Infinity.dll | 0099-00001-00 | 1.0.101.0 | GDS.exe.0099-00001-00[1.0.1.0] Infinity.dll |
| Infinity.Hello.dll | 0099-00001-99 | 1.0.5.0 | GDS.exe.0099-00001-00[1.0.1.0] Infinity.dll |

2000

UNIVERSAL METHOD FOR SUBMITTING GAMING MACHINE SOURCE CODE SOFTWARE TO A GAME CERTIFICATION LABORATORY

CROSS REFERENCE TO RELATED CASES

This application is related in subject matter to Ser. No. 10/789,975, filed Feb. 27, 2004, which application is hereby incorporated herein by reference in its entirety.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings referred to herein: Copyright 2005, Cyberscan Technology, Inc., All Rights Reserved.

BACKGROUND OF THE INVENTION

1. Field of the Invention

This invention relates generally to the field of regulated pay computer-controlled games, either games of skills or games of chance, and more particularly to the field of certification of the related regulated software.

2. Description of the Prior Art and Related Information

Pay entertainment and gaming systems of the prior art, either of the cash-in or the cash-less type, are seriously limited due to the technical choices made in order to comply with gaming regulatory requirements. Regulators are mainly concerned with funds that may be illegally acquired by individuals as well as with funds that may not be acquired by legitimate winners as a result of flaws, cheating and/or stealing. Game regulators are reluctant to accept state-of-the-art operating systems, multimedia and Internet technologies because of security concerns and tend to favor antiquated technology based upon secrecy rather that "open" state-of-the-art technology. A "Request/Authorize" method for downloadable games has been proposed by another company (IGT's Secure Virtual Network in a Gaming Environment—Publication US2002/0116615 A1) but the method disclosed therein does not cover how to ensure that only certified authorized components may execute.

Gaming certification labs (such as Gaming Laboratories International, Inc. (GLI), for example) require game software manufacturers to provide a complete software compilation environment (software, hardware and tools) such that source code may be compiled to produce the complete executable binary code and to test it. In addition, each revision change to the source code (and/or related file) must be done via a formal contractual submission (including source code files, related files and traceability paperwork) subjected to a stringent procedure in order for the gaming laboratory to identify and track the exact lines of changed source codes in the re-testing process. Due to the broad diversity of software executable environments, software development environments and legacy source code found in the gaming industry (gaming machine microprocessors, operating systems, languages, servers, network topologies, graphics studios, development tools, testing tools, emulators, etc. . . . ), management of source code by the gaming labs is essentially manual, lengthy, error prone and costly.

Source Code Control Systems (SCCS) such as MS-SourceSafe, SourceGear-Vault (www.sourcegear.com), NXN (www.nxn-software.com) and more particularly the not-yet released Microsoft Visual Studio 2005 Team System (http://msdn.microsoft.com/vstudio/teamsystem) provide means for developing and managing large scale software projects involving numerous geographically dispersed developers and subcontractors. Indeed managing source code with a SCCS requires specialized skills and training, and as each game supplier typically uses a different commercial SCCS or internally developed SCCS, it is beyond the undertaking of a game certification laboratory to have their engineering stall trained in a plurality of SCCS.

In order to successfully leverage on the new emerging downloadable game paradigm (such as disclosed in commonly owned and co-pending application serial number 10/789,975 filed on Feb. 27, 2004 and entitled Dynamic Configuration of a Gaming System, the entire specification of which is included herewith by reference), there is a need to produce a significant number of regulatory certified games and game variants. The game certification labs have not yet anticipated the complexity of the downloadable game paradigm and have not yet issued precise directives relating to the manner in which game software suppliers are to supply the substantial number of source code files and related filed in a rigorously controlled manner. The complexity of managing source code in the certification life cycle of downloadable game software is such that if not satisfactorily addressed, manufacturers may suffer significant delays and cost in having their software certified—which can already take several years, thereby stifling innovation and increasing costs to the gaming industry. A procedure that may be applied for producing certified downloadable game software is described in the above-referenced Ser. No. 10/789,975 application at FIGS. 11-13). The very first step in generating certified games according to this procedure is to initialize a new submission". In this first step, new source code is transferred from the manufacturer's software development environment into the game certification laboratory integrated certification environment (ICE). Often, this first step is lengthy, painstaking and error prone.

From the foregoing, therefore, it may be appreciated that new and improved methods and systems for submitting new source code from the manufacturer's software development environment to the game certification laboratory are needed.

SUMMARY OF THE INVENTION

Embodiments of the present invention provide universal methods and systems for selecting, installing and uninstalling source code (and associated files) in a rigorously controlled manner, to enable game certification labs to certify large numbers of downloadable game software components. The method is not dependant upon any particular operating system, the language and/or the SCCS used by the certification lab. The methods and systems described herein are particularly adapted for the certification of numerous variants of games necessary for successfully implementing the dynamic casino floor paradigm across different jurisdictions.

For each contractual submission, a precisely identified file (hereafter called an installable submission package) that packages all of the source code, necessary related files and directives necessary for certification may be provided to the gaming certification lab. A packager utility may be used within the game developer's environment to enable selecting the source code to be certified and all of the necessary related files, as well as to enable compilation of installation directives, for example. Thereafter, the source code, related files and the installation directives, for example, may be combined in a single installable submission package file. The installable submission package file name identifier may reflect the certification process thread and stage, that is, may denote the customer, the applicable regulation, initial submission, bug fix, regulatory variant, retirement, etc. The file name identifier may advantageously be or include a text string comprising the relevant explicit codes and/or a GUI (Global Unique Identifier) associated to the applicable certification process details. An installer utility may allow the game certification laboratory to unpack the package provided by the game developer and to execute any included directives (such as, for example, installation, updating or uninstalling of source code and any associated files). In the case of an update, the old source code (and related files) may be advantageously cached in a structured manner such that a given update may be undone, if requested.

The installer utility may allow the target integrated software environment such as MS-Visual Studio to be adapted to cooperate for installing, updating and uninstalling the provided source code and related files in the installable submission package provided to the game certification laboratory.

Still further embodiments of the invention enable the certification authority to bind the certificates to the tested software components.

Embodiments of the present invention leverage the technology described in commonly assigned U.S. patent application filing 60/393,892 entitled—"Secure Game Download" in which code signing and Software Restriction Policy enable executing authorized game software. Code signing and Software Restriction Policy (SRP) technologies are available in Microsoft Windows XP, Windows 2000 and Windows 2003, Embedded Windows XP as well as in future Windows versions (as of this writing, the next version is code-named "Longhorn" and/or "Vista") to ensure that only executable software components from a trusted publisher, let's say "Microsoft", are allowed to run. Code signing and Software Restriction Policy technology are applied to executable components such as *.exe, *.dll, *.ocx, *.vbs, *.msi, *.cab, etc. In addition, Software Installation Policy (SIP) ensures that software components are installed in a controlled fashion. Embodiments of the present invention extend the use of code signing, Software Restriction Policy and Software Installation Policy to individual software components that are allowed to execute in a network connected gaming system by associating a distinct code-signing certificate to each executable software component. Each executable software component version (usually comprising major version, minor version, revision and build) may have a unique certificate. A distinct certificate may be created for each software component version and the two entities (the compiled code and the certificate) may be bound together by a code signing operation, herein called "signcode.exe".

Code signed software components may be packaged together with non-signed software components (if any) into an installation package, such as (but not limited to) MSI Microsoft installation package (MSI=Microsoft Software Installation). An MSI package is an executable component that in turn receives a distinct certificate bound to its content by a code signing operation. Only the software component version that has successfully passed the regulatory certification process may be allowed to run by enforcing an unrestricted policy to the associated certificate.

The manufacturer's game software components comprising the source code, the associated data and control files as well as each component's location path within the manufacturer's development environment may be packaged by the manufacturer's deployment author into an .MSI or equivalent installation package that receives a unique identifier and a versioning number corresponding to the submission number and that may be code signed with a predetermined PKI certificate issued by a trusted certificate issuing authority. The game certification laboratory receiving the installation package may then execute the installation after verifying the validity of the PKI certificate in order to unpack the game software components in the game certification laboratory's software development environment at the same location paths as the supplier's development environment, or at locations manually entered during the installation process. The laboratory standard Windows "Add/Remove Program" utility shows the submission number and/or other identifications or notes of the installed source code. Source code patch sequencing may be carried out in the same manner using a version of an installer that supports patch sequencing, e.g. "Service Pack", "Quick Fix", "Engineering Fixes", etc., the manufacturer's deployment author being responsible to embed the related patch sequencing control instructions within the package. Microsoft code developers may create a patch installation package by generating a patch creation file using the Msimsp.exe service. The laboratory standard Windows "Add/Remove Program" utility may show the submission number and/or other identifications or notes of the installed source code patch. Patch sequencing may allow smart application of patches such as but not limited to targeting, multi-targeting, multi-family, scoping, conditionality, chaining, superseding, forcing removal of prior patches, reverting of changes, and controlling life of source code patches. Game source code changes may then be examined by the game certification laboratory in the context of the structured patch sequencing information provided and be judiciously compiled.

Once the certification is completed, the game software source code and related files including the files derived during the code compilation process may be uninstalled by the laboratory by executing the uninstall command associated to the installed package. In the same manner, a predetermined source code patch may be installed or uninstalled from the game certification laboratory software development environment.

Installation standard actions and/or "custom actions" may be embedded by the manufacturer's deployment author into the installation package such as to carry out various auxiliary automated operations prior, during or after the installation of the source code and related files. In particular, the custom actions may be used for removing all files derived during the compilation and testing of the game software from the laboratory software development environment during the source code uninstalling. When the packages are code signed, the installing utility software (i.e. Microsoft msiexec.exe version 3.0 and later) being part of the trusted computing base then the action scripts are part of the trusted computing base and may be trusted during the installing and uninstalling of the source code and related files.

The packages containing the original source code and the source code patches may be code signed such as to provide persistent proof of origin which may be verified at any time. The method is generic and may be implemented under any operating system such Microsoft Windows, Linux, Unix and Apple Mac OS without the game certification laboratory having to learn a complex source code configuration management software.

Also, RM (Rights Management) technology offered with Microsoft Office 2003, with the associated RM services and SDK (Software Development Kit) may be used to ensure that only authorized data files may be accessed, viewed, copied or modified.

Accordingly, an embodiment of the present invention is a computer-implemented method for managing game source code for submission to a game certification laboratory. Such a method may include steps of selecting, in a first environment, the game source code and related files to be submitted to the game certification laboratory; packaging the selected source code and the related files into an installation package, and providing the installation package to the game certification laboratory for installation in a second environment.

According to further embodiments, the packaging step may include a full location path of the selected source code and related files. The related files may include one or more of: compiling directives, make directives, build directives, Microsoft Visual Studio Project directives, MS Visual Studio Solution directives, Microsoft MSBuild directives Visual, Studio automation scripts, compiled source code code-signing directives and target deployment directives, for example. The related files may include one or more of: data files, configuration files, XML configuration files, game media assets, video assets, test utilities, command scripts, policy scripts, target system policy enforcement scripts and target system execution restriction policy directives, for example. The installation package may be code signed with a PKI certificate issued by a trusted certificate authority. The installation package may contain installation custom actions, and such custom actions may be trusted when the package is code signed. The installation package may contain installation custom actions that are operative to perform automation operations in the second environment during package installation and/or un-installation. The second environment may be within the game certification laboratory and the method further may include a step of executing the installation package to unpack and install the selected source code and the related files into the second environment within the game certification laboratory. The first environment may include an integrated software development environment (IDE). The integrated software development environment may include MS-Visual Studio, for example. The second environment may include an integrated software development environment (IDE), for example. The integrated software development environment may include MS-Visual Studio, for example. The installation package in the providing step may be a Microsoft Installer Package (MSI), for example. The packaging step may include a step of code signing the installation package, and the code signing step may include a step of obtaining a distinct PKI certificate. The method may also include steps of configuring certificate rule policies to enable execution of the code signed installation package in the game certification laboratory, and configuring enforcement of the certificate rule policies. The packaging step may include embedding within the installation package attributes one or more of: a global unique identifier (GUID), a package file name identifier, a manufacturer identifier, a customer identifier, an applicable regulation identifier, a submission identifier, a part number identifier, a version identifier, a patch sequence identifier, and a regulatory variant identifier, for example. The game certification laboratory may be configured to check the identification details of the installed source code by viewing an "Add or Remove Programs" utility, including the installed source code patches when a "Show Updates" option is selected. The method may also include a step of removing installed source code from the second environment by selecting a corresponding "Remove" button in an "Add or Remove Programs" utility. The method may also include a step of removing an installed source code update or patch sequence from the second environment by selecting a "Show Updates" option and by selecting a remove button in an "Add or Remove Programs" utility. The present computer-implemented method may also include a step of removing source code, a source code update or a patch sequence from the second environment by selecting a corresponding option in an installer console program having a format "msiexec.dll/x {package}", for example. The installation package may contain shortcut definitions for adding shortcuts in the second environment during the package installation for automating the source code certification process. The providing step may include providing the installation package in one of a CD-ROM, a movable media, an encrypted movable media, an email, an encrypted email, via VPN, and via encrypted Internet download, to name but a few possibilities. The source code of the second environment may be maintained synchronized with the source code of the first environment via the submission of the installation package. The source code and the related files of the second environment may be maintained synchronized with the source code and the related files of the first environment via the submission of the installation package. The certificate may be generated by the certificate authority under control of the manufacturer, the game certification lab, a game regulatory organization, a trusted third party and/or VeriSign, for example.

According to another embodiment thereof, the present invention is a machine-readable medium having data stored thereon representing sequences of instructions which, when executed by a computer, causes the computer to carry out a method of managing game source code and related files for submission to game certification laboratory, by carrying out steps of: selecting, in a first environment, the game source code and related files to be submitted to the game certification laboratory; packaging the selected source code and the related files into an installation package, and providing the installation package to the game certification laboratory for installation in a second environment.

The packaging step may include a full location path of the selected source code and related files. The related files may include compiling directives, make directives, build directives, Microsoft Visual Studio Project directives, MS Visual Studio Solution directives, Microsoft MSBuild directives Visual, Studio automation scripts, compiled source code code-signing directives and target deployment directives, for example. The related files may include, for example, data files, configuration files, XML configuration files, game media assets, video assets, test utilities, command scripts, policy scripts, target system policy enforcement scripts and/or target system execution restriction policy directives, for example. The installation package may be code signed with a PKI certificate issued by a trusted certificate authority. The installation package may contain installation custom actions, and such custom actions are trusted when the package may be code signed. The installation package may contain installation custom actions that are operative to perform automation operations in the second environment during package installation and/or un-installation. The second environment may be within the game certification laboratory and the method further may include a step of executing the installation package to unpack and install the selected source code and the related files into the second environment within the game certification laboratory. The first and/or second environment may include an integrated software development environment (IDE). The integrated software development environment may include MS-Visual Studio. The installation package in the providing step may include a Microsoft Installer Package (MSI). The packaging step may include a step of code signing the installation package, and the code signing step may include a step of obtaining a distinct PKI certificate. Steps may be carried out to configure certificate rule policies to enable execution of the code signed installation package in the game certification laboratory, and configure enforcement of the certificate rule policies. The packaging step may include embedding within the installation package attributes of at least one of a global unique identifier (GUID), a package file name identifier, a manufacturer identifier, a customer identifier, an applicable regulation identifier, a submission identifier, a part number identifier, a version identifier, a patch sequence identifier, and a regulatory variant identifier. The game certification laboratory may be configured to check the identification details of the installed source code by viewing an "Add or Remove Programs" utility, including the installed source code patches when a "Show Updates" option is selected. A step may be carried out to remove installed source code from the second environment by selecting a corresponding "Remove" button in an "Add or Remove Programs" utility. A step may also be carried out to remove an installed source code update or patch sequence from the second environment by selecting a "Show Updates" option and by selecting a remove button in an "Add or Remove Programs" utility. A step may also be carried out to remove source code, a source code update or a patch sequence from the second environment by selecting a corresponding option in an installer console program having a format "msiexec.dll/x {package}", for example. The installation package may contain shortcut definitions for adding shortcuts in the second environment during the package installation for automating the source code certification process. The providing step may include providing the installation package in one of a CD-ROM, a movable media, an encrypted movable media, an email, an encrypted email, via VPN, and via encrypted Internet download, to name but a few possibilities. The source code of the second environment may be maintained synchronized with the source code of the first environment via the submission of the installation package. The source code and the related files of the second environment may be maintained synchronized with the source code and the related files of the first environment via the submission of the installation package. The certificate may be generated by the certificate authority under control of manufacturer, the game certification lab, a game regulatory organization, a trusted third party, and/or VeriSign, for example.

According to yet another embodiment thereof, the present invention is an automated platform to enable regulatory certification of game software components that includes a reference platform representative of a target network of gaming systems and comprising a software-building environment located at a premise of a manufacturer of the game software components; a certification platform located at a regulatory certification authority, the certification platform being substantially identical to the reference platform, and installation package generating means for generating at least one installation package that may include the game software components for which the regulatory certification is sought.

The installation package may include a full location path of the game software components. The related files may include compiling directives, make directives, build directives, Microsoft Visual Studio Project directives, MS Visual Studio Solution directives, Microsoft MSBuild directives Visual, Studio automation scripts, compiled source code code-signing directives and/or target deployment directives, for example. The related files may include one or more of data files, configuration files, XML configuration files, game media assets, video assets, test utilities, command scripts, policy scripts, target system policy enforcement scripts and target system execution restriction policy directives, for example. The installation package may be code signed with a PKI certificate issued by a trusted certificate authority. The installation package may contain installation custom actions, and such custom actions may be trusted when the package may be code signed. The installation package may contain installation custom actions for performing automation operations in the certification platform during at least one of package installation and un-installation. The installation package may be configured to be executed to unpack and install the game software components within the certification platform. The software building environment may include an integrated software development environment (IDE), such as MS-Visual Studio, for example. The certification platform may also include an integrated software development environment (IDE), such as MS-Visual Studio, for example. The installation package may include a Microsoft Installer Package (MSI), and the installation package may be code signed. The code signed installation package may include a distinct PKI certificate. The automated platform may be further configured to configure certificate rule policies to enable execution of the code signed installation package in the certification platform, and to configure enforcement of the certificate rule policies. The installation package may include attributes of one or more of a global unique identifier (GUID), a package file name identifier, a manufacturer identifier, a customer identifier, an applicable regulation identifier, a submission identifier, a part number identifier, a version identifier, a patch sequence identifier, and/or a regulatory variant identifier, for example. The installation package may be configured such that the certification platform is able to check the identification details of the software components by viewing the "Add or Remove Programs" utility, including any installed source code patches when the "Show Updates" option is selected. The installation package may be configured such that the certification platform is able to remove the software components from by selecting a "Remove" button in a "Add or Remove Programs" utility. The installation package may be configured such that the certification platform, when a "Show Updates" option is selected, is able to remove the software components by selecting a "Remove" button in an "Add or Remove Programs" utility. The software components may include a source code, source code update or patch sequence and the installation package may be configured such that the certification platform is able to remove the source code, source code update or patch sequence by selecting an option in an installer console program having a format "msiexec.dll/x {package}", for example. The installation package may contain shortcut definitions for adding shortcuts in the certification platform during the package installation for automating the source code certification process. The providing step may include providing the installation package in one of a CD-ROM, a movable media, an encrypted movable media, an email, an encrypted email, via VPN, and via encrypted Internet download. The software components may include a source code and the software components of the certification platform may be maintained synchronized with the source code of the software-building environment via the submission of the installation package. The software components of the certification platform may be maintained synchronized with the software components of the software-building environment via the submission of the installation package. The certificate may be generated by the certificate authority under control of the manufacturer of the software components, of a game certification laboratory, of the regulatory certification authority, of a trusted third party and/or of VeriSign, for example.

According to still another embodiment thereof, the present invention is a computer-implemented method for synchronizing game source code and related files between a software development environment of a game certification laboratory and a software development environment of a game manufacturer. The method may include steps of selecting, in the game manufacturer's software development environment, the source code and related files to be submitted to the game certification laboratory; packaging the selected source code and the related files into an installation package, and providing the installation package to the game certification laboratory for installation in the software development environment of the game certification laboratory.

The packaging step may include a full location path of the selected source code and related files. The related files may include compiling directives, make directives, build directives, Microsoft Visual Studio Project directives, MS Visual Studio Solution directives, Microsoft MSBuild directives Visual, Studio automation scripts, compiled source code code-signing directives and/or target deployment directives, for example. The related files may include, for example, data files, configuration files, XML configuration files, game media assets, video assets, test utilities, command scripts, policy scripts, target system policy enforcement scripts and target system execution restriction policy directives. The installation package may be code signed with a PKI certificate issued by a trusted certificate authority. The installation package may contain installation custom actions, and such custom actions may be trusted when the package may be code signed. The installation package may contain installation custom actions that are operative to perform automation operations in the software development environment of the game certification laboratory during package installation and/or un-installation. The method may also include a step of executing the installation package to unpack and install the selected source code and the related files into the software development environment of the game certification laboratory. The software development environment of the game manufacturer may include an integrated software development environment (IDE), for example. The integrated software development environment of the game manufacturer may include MS-Visual Studio, for example. The software development environment of the game certification laboratory may include an integrated software development environment (IDE), for example. The integrated software development environment of the game certification laboratory may include MS-Visual Studio, for example. The installation package in the providing step may include a Microsoft Installer Package (MSI), for example. The packaging step may include a step of code signing the installation package and the code signing step may include a step of obtaining a distinct PKI certificate. The method may also include steps of: configuring certificate rule policies to enable execution of the code signed installation package in the game certification laboratory, and configuring enforcement of the certificate rule policies. The packaging step may include embedding within the installation package attributes one or more of a global unique identifier (GUID), a package file name identifier, a manufacturer identifier, a customer identifier, an applicable regulation identifier, a submission identifier, a part number identifier, a version identifier, a patch sequence identifier, and a regulatory variant identifier, for example. The game certification laboratory may be configured to check the identification details of the installed source code by viewing an "Add or Remove Programs" utility, including the installed source code patches when a "Show Updates" option is selected. The method may also include a step of removing installed source code from the software development environment of the game certification laboratory by selecting a corresponding "Remove" button in an "Add or Remove Programs" utility. The method may also include a step of removing an installed source code update or patch sequence from the software development environment of the game certification laboratory by selecting a "Show Updates" option and by selecting a remove button in an "Add or Remove Programs" utility. The method may also include a step of removing source code, a source code update or a patch sequence from the software development environment of the game certification laboratory by selecting a corresponding option in an installer console program having a format "msiexec.dll/x {package}", for example. The installation package may contain shortcut definitions for adding shortcuts in the software development environment of the game certification laboratory during the package installation for automating the source code certification process. The providing step may include providing the installation package in one of a CD-ROM, a movable media, an encrypted movable media, an email, an encrypted email, via VPN, and via encrypted Internet download, for example. The source code of the software development environment of the game certification laboratory may be maintained synchronized with the source code of the software development environment of the game manufacturer via the submission of the installation package. The source code and the related files of the second environment are maintained synchronized with the source code and the related files of the first environment via the submission of the installation package. The certificate may be generated by the certificate authority under control of, for example, the manufacturer, the game certification lab, a game regulatory organization, a trusted third party, and VeriSign.

BRIEF DESCRIPTION OF THE DRAWINGS

FIG. 4 illustrates the information that may be entered in the Extended Attributes of a PKI certificate, according to an embodiment of the present invention.

FIG. 20 illustrates the method to generate a code signed companion software component, according to an embodiment of the present invention.

DETAILED DESCRIPTION

Reference will now be made in detail to the construction and operation of preferred implementations of the present invention illustrated in the accompanying drawings. The following description of the preferred implementations of the present invention is only exemplary of the invention. The present invention is not limited to these implementations, but may be realized by other implementations.

Figure 1:
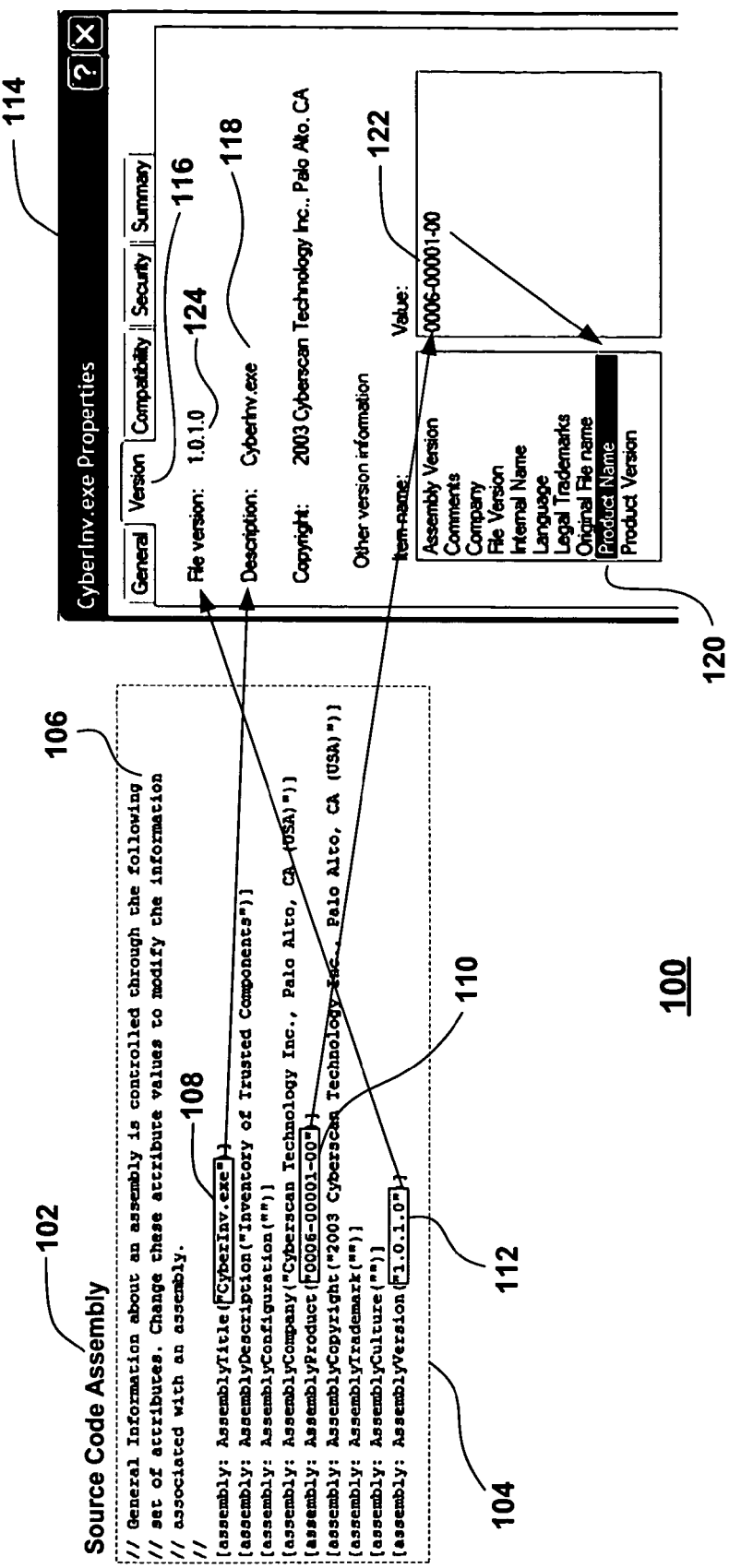
FIG. 1 illustrates the intrinsic information that uniquely identifies each executable software component, according to an embodiment of the present invention.

FIG. 1 illustrates Software Component Identification and Traceability via File Properties, according to an embodiment of the present invention. Shown at 100 in FIG. 1 is the intrinsic information that uniquely identifies each executable software component. The executable component source code comprises executable code lines (e.g. X=X+1; not shown here) and associated source code assembly information 102, 104 that comprises comment lines 106 and assembly information. Herein, AssemblyTitle 108, AssemblyProduct 110 and AssemblyVersion 112 are configured. The AssemblyTitle 108 is set to CyberInv.exe that is the friendly name of the executable software component; AssemblyProduct 110 is set to 0006-00001-00 that is the part number of the executable software component and AssemblyVersion 112 is set to 1.0.1.0, which is the version number of the executable software component. Once the source code is compiled and the executable is built (CyberInv.exe in this case), the configured assembly information is available via the File Property of Windows 114 when right clicking on the file CyberInv.exe and selecting "Properties" and "Version", as shown at 116. The friendly name is shown in the Description field 118, the part number is shown in the Product Name field 120, 122 and the version is shown in the File Version field 124.

It will be apparent to those of skill in the art of software development that intrinsic information that uniquely identifies each executable software component may be obtained in various combinations of assembly directives and file property fields. Additional information may be configured such as, for example, the software component part number, major version number, minor version number, build number, revision number, project name, type of software component, language variant, game regulation variant, friendly name, identification of the game certification laboratory, identification of the client, and other predetermined identification identifiers. The identifiers associated with the executable software component using source code assembly directives may, therefore, be traceable via the File Property features of the Windows operating system.

An example of such a configuration is CST3000-0006-00001-00[1.0.1.0]{21}^11~9% S CyberInv.exe that comprises a concatenation of identifiers that may be used in a file name or a PKI certificate subject name. According to this example, CST3000 is the marketing system product identification or the project name; 0006-00001-00 is the software component part number; [1.0.1.0] details the software component major version number, minor version number, build number, revision number; {21} is the software component variant identifier; ^11 identifies the game certification laboratory that certifies the software component; ~9 identifies the customer for which this software component is certified; %S is the software component language variant ("S" for Spanish in this example); CyberInv.exe is the software component friendly name for quick identification. Spaces may be used freely and the identifier fields may be written in any order so as to facilitate reading. Identifier fields may be omitted whenever the context already provides such information. The framing or delimiter characters such as [ ], { },~, ^, % which are allowable characters to be used in file names and certificate subject names facilitate human recognition as well as string searches for particular attributes (global search for all Spanish variants for example).

In the same manner, a selected set of identification information making up the certificate subject name may be used for making up the file name of PKI certificate related files such as *.CER, *.P7B and *.PVK such as to facilitate human identification, string searches and file searches.

Figure 2:
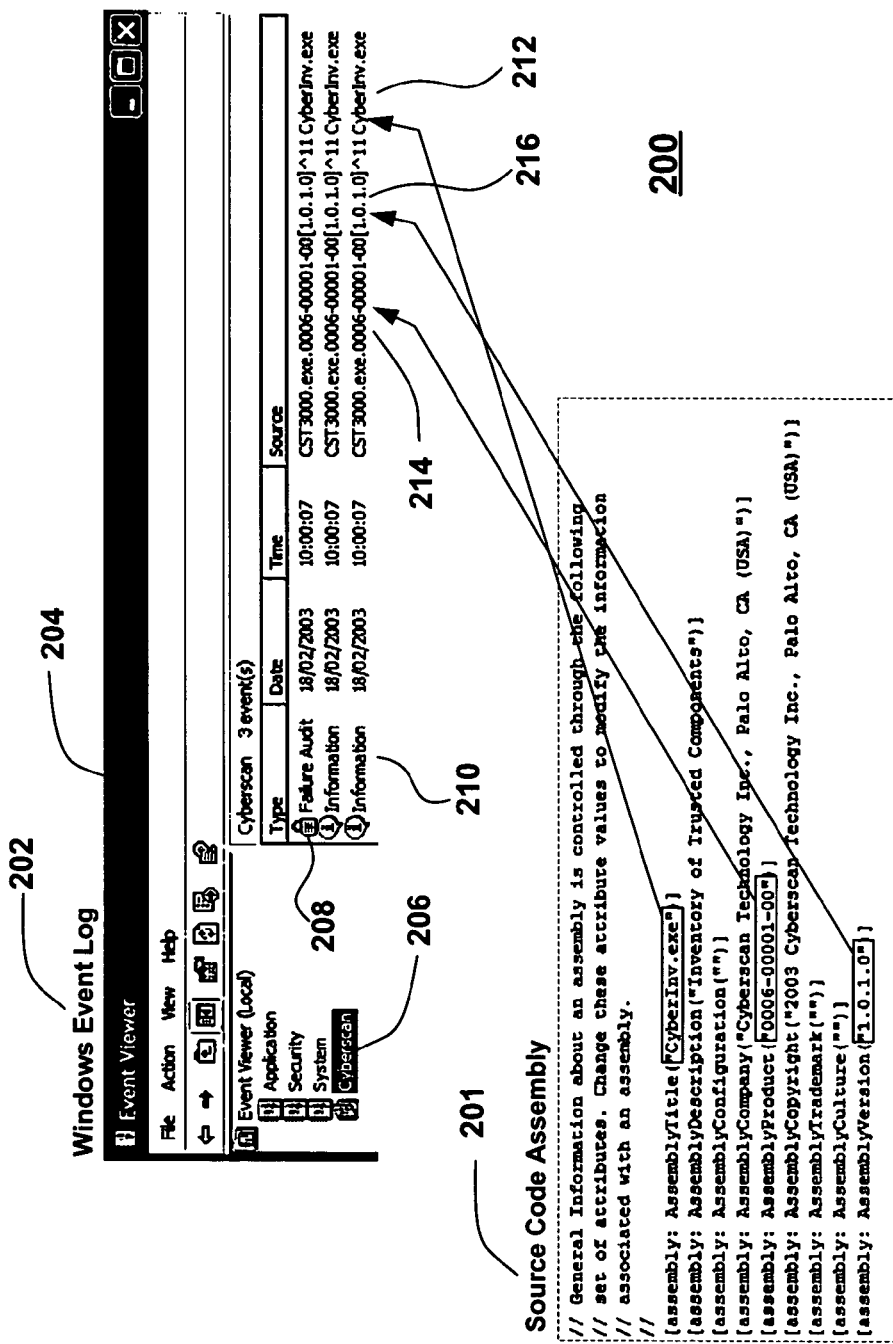
FIG. 2 illustrates the information uniquely identifying each executable software component being made available into the Windows Event Log upon execution of the software component, according to an embodiment of the present invention.

FIG. 2 illustrates traceability via the Windows Event Log. Reference numeral 200 in FIG. 2 illustrates the information uniquely identifying each executable software component being made available to the Windows Event Log upon execution of the software component. The Windows Event Log 202 is a repository for logging important events; it is viewed via the Event Viewer 204. Windows default event log bins (or containers) are Application, Security and System. In the illustrated example, an Event Log bin 206 denominated "Cyberscan" has been added. The Cyberscan bin 206 contains traceability information in its "Source" field that is being logged by each of the executable software components. The software executable software component makes use of the Event Log API to "splash" its identification information into the source field of a predetermined bin in the Windows Event Log each time it starts execution, or at any other time should the occurrence of an event be traced, in order to provide an audit trail to be examined by auditors. The part number 214, version 216 and friendly name 212 identifiers associated to the executable software component using source code assembly directives 201 are therefore traceable via the Event Log features of the Windows operating system. Other information associated with the executable software component may be splashed into the event log for additional traceability. The "Type" field 208 may flag an important audit condition such as here "Failure Audit" to alert the auditor.

Figure 3:
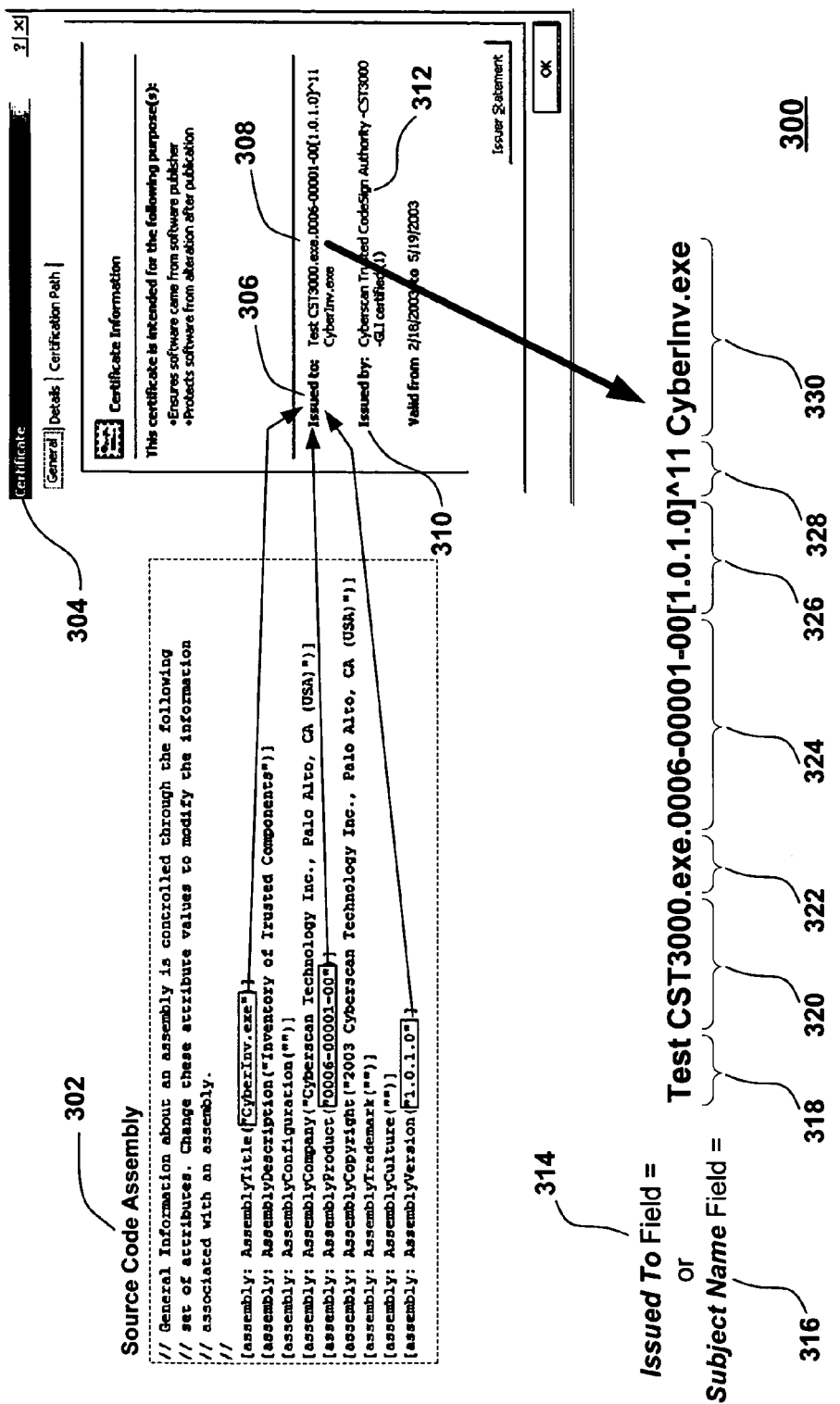
FIG. 3 illustrates the information (test certificate indicator, project/product code, type of executable code, part number, major/minor/build/version, game certification laboratory identifier, friendly name) uniquely identifying each executable software component being used to generate the "Subject Name" (or "Issued to" field, or "CommonName" field) of the individual PKI certificate associated to each executable software component, according to an embodiment of the present invention.

FIG. 3 illustrates the Certificate "Issued to" Field. Reference numeral 300 illustrates the information 308 (test certificate indicator 318, project/product code 320, type of executable code 322, part number 324, major/minor/build/version 326, game certification laboratory identifier 328, friendly name 330) uniquely identifying each executable software component being used to generate the "Subject Name" 316 (or "Issued to" field 306, 314, or also known as the "CommonName" field) of the individual PKI certificate 304 associated with each executable software component, according to an embodiment of the present invention. The friendly name, part number and version of the executable software components may be substantially identical to those entered in the source code assembly 302. "Subject Name" 316 and "Issued to" field 306, 314 refer to the same information; Subject Name is preferably used hereafter. The certificate authority 312 responsible for generating the PKI certificate is shown in the "Issued by" field 310.

FIG. 4 at 400 illustrates the information that may be entered in the Extended Attributes 408 of a PKI certificate 402, according to an embodiment of the present invention. This information may be viewed by selecting, for example, the "Details" tab 404 of the certificate 402 and selecting "Extensions Only", as shown at 406. Intrinsic information that uniquely identifies each executable software component may be entered in the extended attributes of a PKI certificate in order to attain the same purpose as described for FIG. 3 as an alternative to entering the information in the certificate Subject Name. In the same manner, additional identification information to those entered in the Subject Name may be entered in the extended attributes.

Figure 5:
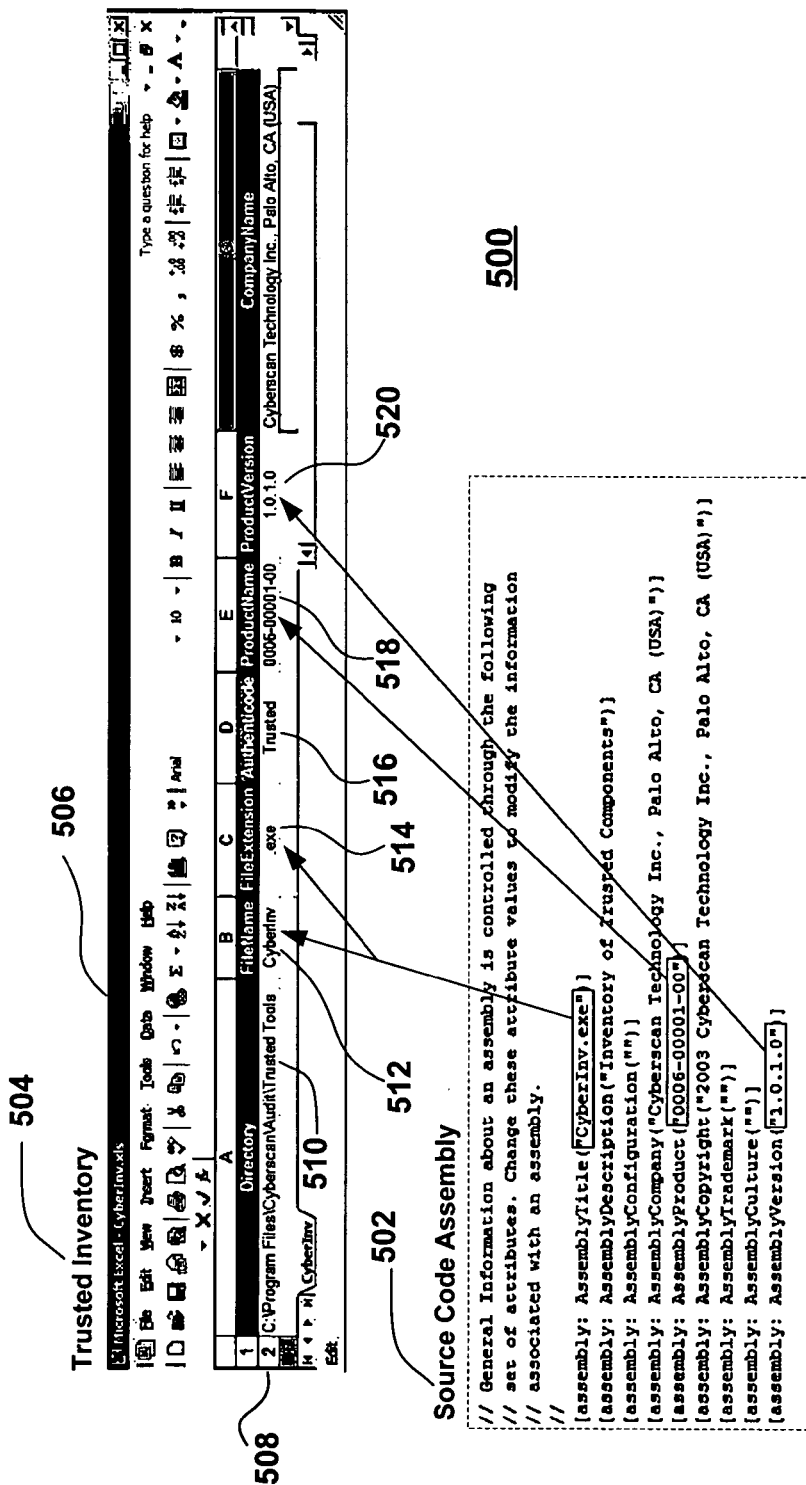
FIG. 5 illustrates the information that may be obtained using the Trusted Inventory tool, according to an embodiment of the present invention.

FIG. 5 illustrates traceability via the Trusted Inventory Tool 504, according to an embodiment of the present invention. Reference numeral 500 in FIG. 5 illustrates the information that may be obtained using the Trusted Inventory tool 504. The trusted inventory tool 504 is a simple application that searches for executable files through the branches of a given tree directory and determines whether the executable software component may be trusted by, for example, calling the Microsoft ChkTrust.exe tool. If the executable software component is signed by a valid PKI certificate and its executable binary data is uncorrupted (its recalculated hash matches the code signature), the ChkTrust.exe tool returns the authenticode "Trusted" attribute; an "Untrusted" attribute is returned otherwise. The Trusted attributes are automatically tabulated in a spreadsheet such as, for example, Microsoft Excel as depicted at 506. Each line 508 in the table provides details on the executable software component that is being examined, such as program path location 510, friendly name 512, executable type 514, authenticode trusted attribute 516, part number 518 and version 520. According to an embodiment of the present invention, therefore, the part number 518, version 520 and friendly name 512 514 identifiers associated with the executable software component using source code assembly directives 502 are traceable via the Trusted Inventory tool.

Figure 6:
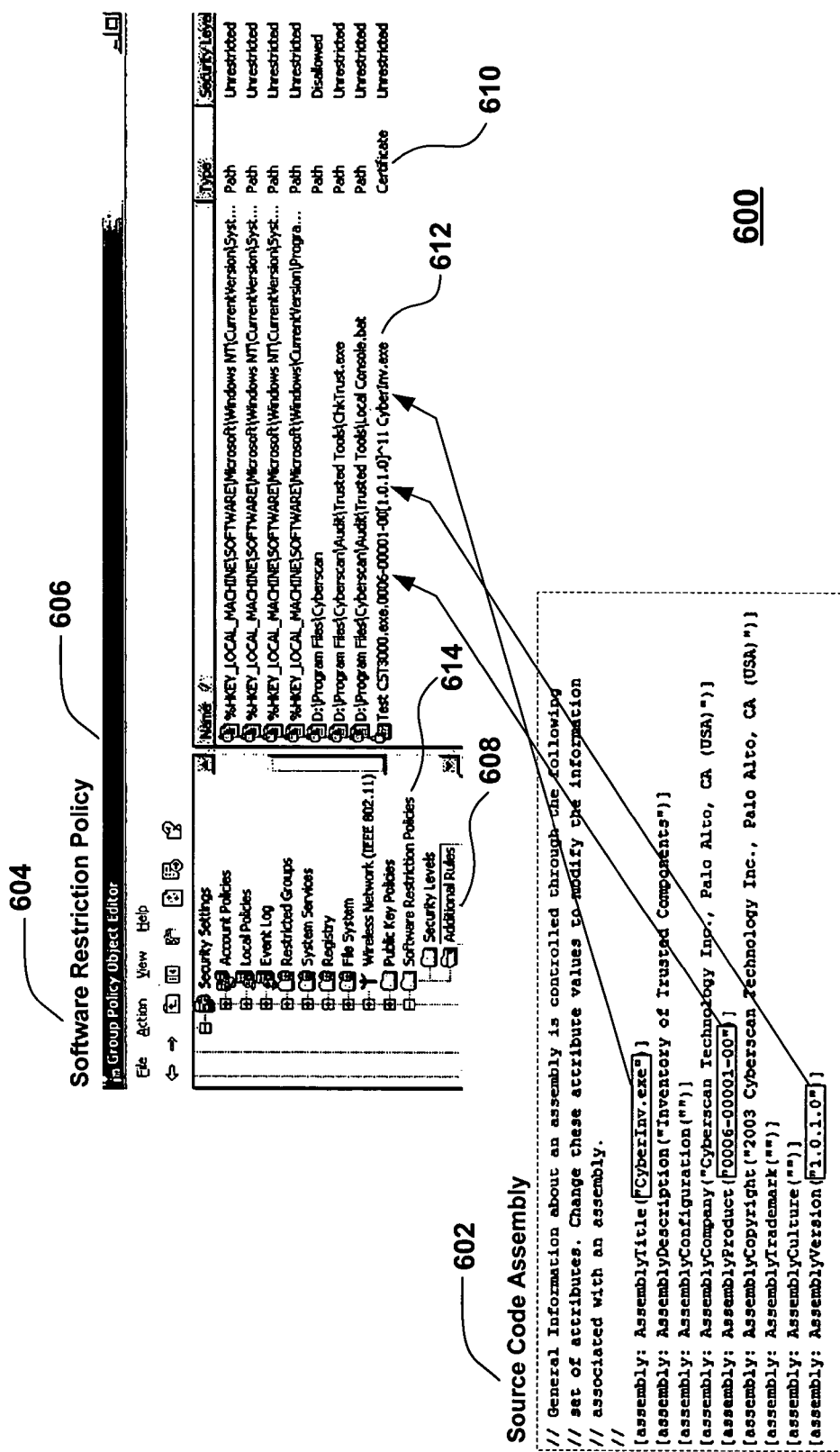
FIG. 6 illustrates the information that may be entered to configure a type-certificate Software Restriction Policy rule, according to an embodiment of the present invention. A Software Restriction Policy (SRP) is configured using the Group Policy Object Editor.

Reference numeral 600 in FIG. 6 illustrates the information that may be entered to configure a type-certificate Software Restriction Policy rule. A Software Restriction Policy (SRP) 604 may be configured using the Group Policy Object Editor 606. The type-certificate Software Restriction Policy rule 610 may be entered in the "Additional Rules" node 608 of the Software Restriction Policy object 614. In FIG. 6, the part number, version and friendly name configured in the source code assembly 602 are recognizable in the certificate subject name 612.

Figure 7:
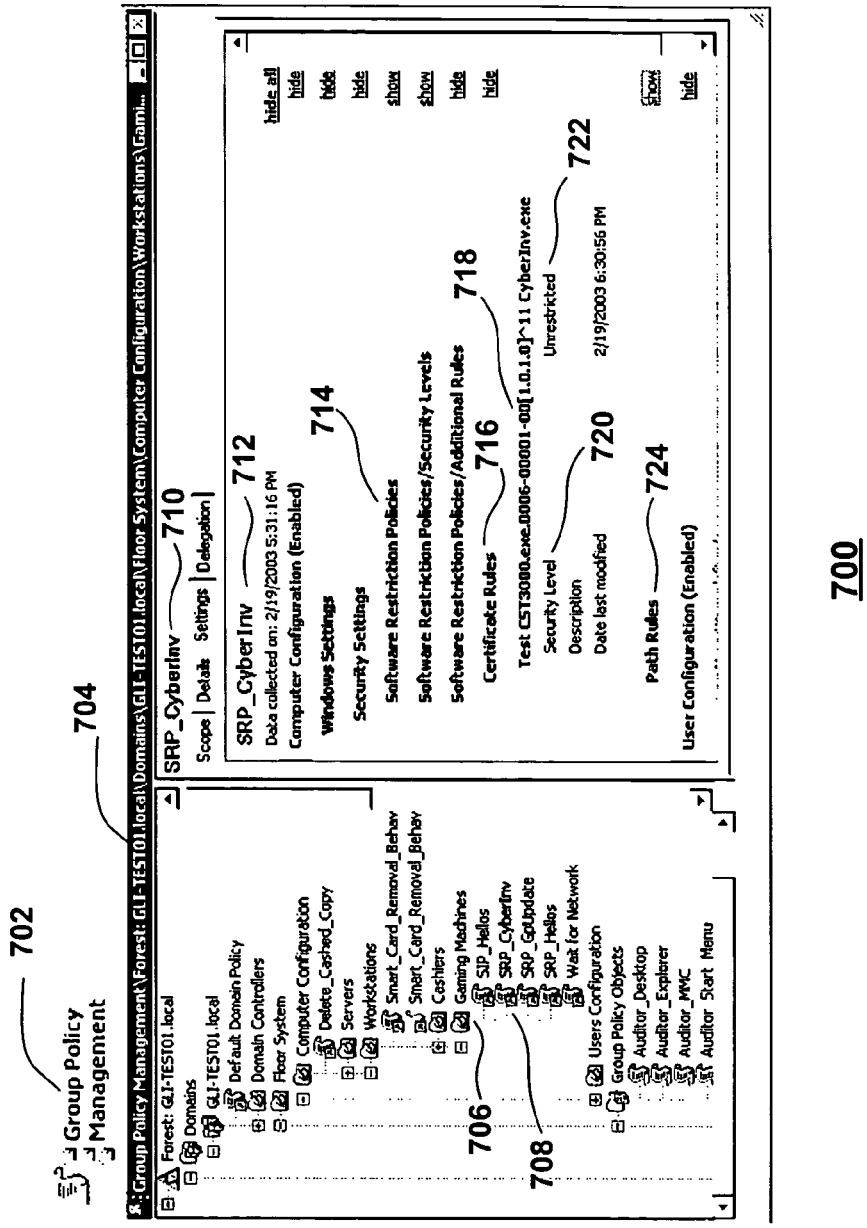
FIG. 7 illustrates the policies that are associated to the active directory container used to configure the gaming machines, according to an embodiment of the present invention.

FIG. 7 illustrates SRP Certificate Rules Policies via the Group Policy Management Console, according to an embodiment of the present invention. Reference numeral 700 in FIG. 7 illustrates the policies that are associated to the active directory container used to configure the gaming machines referenced at 706. Policies are managed using the Group Policy Management Console 702, 704. In this illustration, a policy named "SRP_CyberInv" 708, 710, 712 is selected, for the purpose of viewing a detailed report of the rules that are configured. The report shows details in a hierarchical order. This exemplary policy defines only one certificate rule 716 in the Software Restriction Policy node 714. The certificate subject name 718 is set with a security level 720 of "Unrestricted", as shown at 722, thus ensuring that only the executable software component identified in the certificate subject name is authorized to execute when the policy 714 is enforced. The SRP path rules 724 must be configured such as to prevent non-authorized software from executing. The policy 708 is enforced when it is linked to its container object 706 herein named "Gaming Machines".

Figure 8:
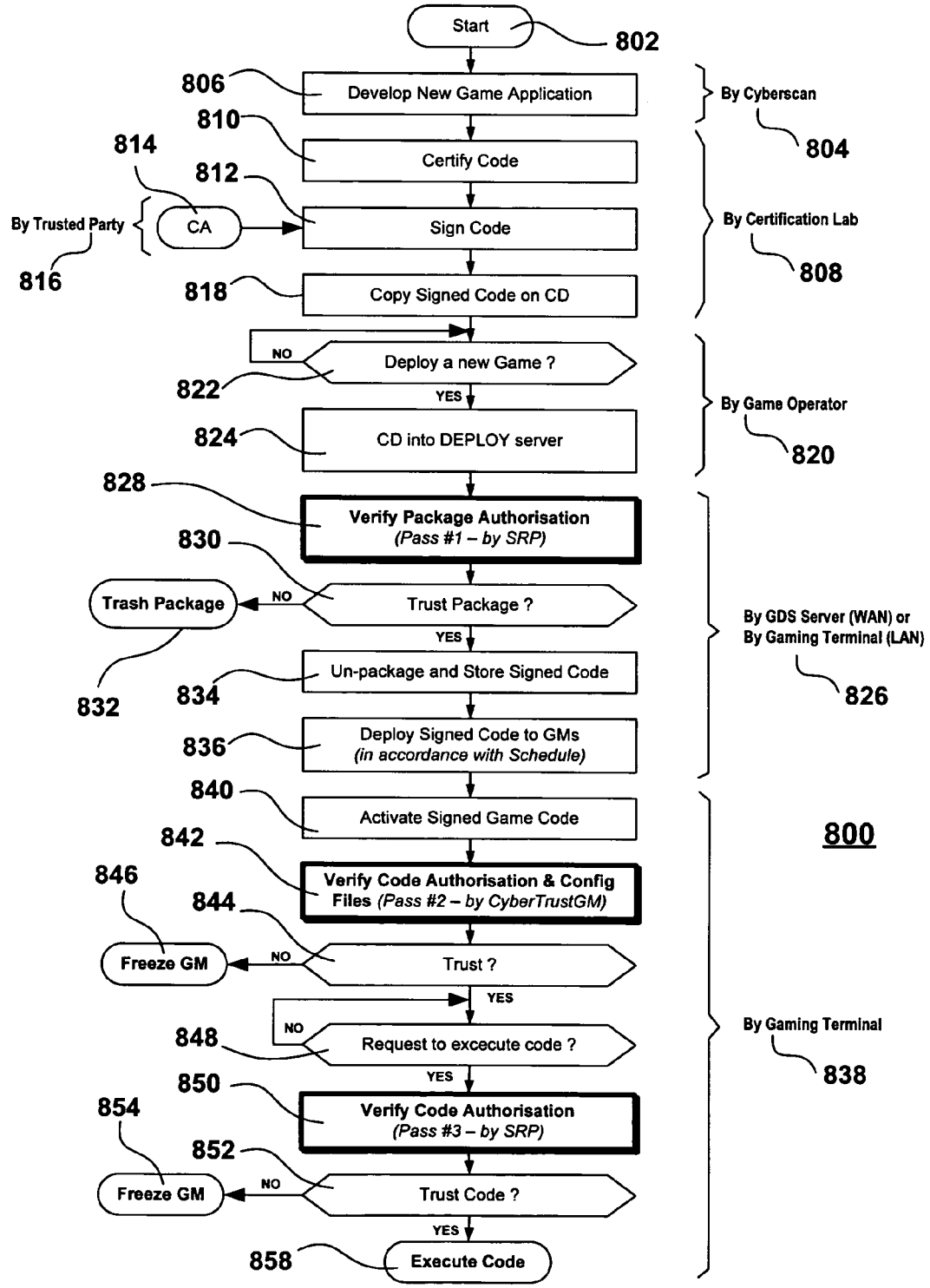
FIG. 8 illustrates an exemplary cycle from the moment a game is being created until it is first executed on a gaming terminal, according to an embodiment of the present invention.

Reference numeral 800 in FIG. 8 illustrates an exemplary cycle from the moment a game is being created until it is first executed on a gaming terminal, according to an embodiment of the present invention. The flowchart 800 starts at 802 when the decision to initiate a project to develop and release a new game is made. The game developer (Cyberscan here, for illustrative purposes only) 804 develops a new game application 806 whose code must be certified at 810 by a recognized game certification laboratory 808. The certified code must then be signed as shown at 812 using PKI certificates produced by a certificate issuing authority (CA) 814 controlled by a trusted party 816. The trusted party 816 may be the game certification laboratory 808. The signed executable software components may be packaged in code-signed MSI installation packages signed in a manner substantially identical to the executable software components, that is, with a unique PKI certificate whose subject name contains part number, version and friendly name identifiers for the MSI package. The MSI packages together with scripts may then be copied to a removable media, such as a CD-ROM 818 for example.

The game operator 820 receives the CD-ROM and when it decides to deploy the new game 822, it copies the packages and associated scripts from the removable media into a library repository on a server 824 (the DEPLOY server in this case). The scripts contain automation tasks such as copying to the repository and configuring the policies.

In the case of gaming terminals connected in a LAN, each gaming terminal 826 is controlled by the policies as soon as they are enforced. The Software Installation Policies (SIPs) controlling the installation of the new game automatically execute the MSI installation packages upon policy enforcement, provided the corresponding Software Restriction Policies have been configured to authorize the execution of the MSI installation packages. This process is performed at 828, 830. If no SRP authorizes the execution of the MSI installation packages, the installation is ignored, as shown at 832. When the MSI installation package is authorized to execute, the software components and other files contained in the package may be copied to the gaming terminals, as suggested at reference numeral 834 836.

Other configuration tasks may also be carried out during the Microsoft installer installation process such as, for example, setting the Windows registry, setting shortcuts and installing software patches. Patches (e.g., updates) to the game software and/or related files may be applied and sequenced according to, for example, the method outlined at http://msdn.microsoft.com/library/en-us/msi/setup/patching.asp. The Microsoft Windows Installer is integrated with Software Restriction Policy in Microsoft Windows XP, and may be used to administer software patches to the game software components submitted to the software development environment of the game certification laboratory. However, embodiments of the present inventions are not limited to the use of Microsoft Windows Installer. In Microsoft Windows Installer, the Software Restriction Policy is configurable through group policy, and allows an administrator to restrict installation of packages using a certificate rule. The software restriction policy may be evaluated the first time a package is installed, when a new patch is applied, when the installation package is re-cached and when uninstalling the installation package. Multiple patches may be applied to a product in a constant order, regardless of the order that the patches are provided, by providing patch sequencing information into the MsiPatchSequence table of the patch installation package. Installed patches may be uninstalled singly, and in any order, without having to uninstall and reinstall the entire application and other patches.

The Windows Installer provides many built-in actions for performing the installation process. Standard actions are sufficient to execute an installation in most cases. However, there are situations where the developer finds it necessary to write a custom action and to include these custom actions in the installation package to be submitted to the software development environment of the game certification laboratory. The installation package may be code signed with a PKI certificate issued by a trusted certificate authority, and these custom actions may be trusted when the package is code signed. For example, the custom actions may be operative to perform automation operations in the software development environment of the game certification laboratory during the installation and/or un-installation of the installation package. Custom Actions may be written to, for example, launch an executable during installation that is installed in the software development environment of the game certification laboratory, to call special functions during an installation that are defined in a dynamic-link library (DLL), to defer the execution of some actions until the time when the installation script is being executed, or run a nested installation on the software development environment of the game certification laboratory, for example. Additional information on such custom actions are available at http://msdn.microsoft.com/library/en-us/msi/setup/custom_actions.asp.

Download of the game software components from the game repository to the gaming terminals may occur as soon as the associated Software Installation Policies are enforced (and the SRPs for the MSI installation package is permitted accordingly). Therefore, scheduling of the download may be achieved by simply enforcing the associated software installation policies at a given time; this may be accomplished by having an operator manually enforcing the SIP at a predetermined time via the group policy management console, or having a process automatically enforcing the SIP at a predetermined time via the API to the group policy management console. Enforcing a policy may be achieved by linking the selected policy to the selected policy object in the domain controller active directory.

Game activation 840 that authorizes execution of the game may be achieved by enforcing the associated Software Restriction Policies. In the same manner, scheduled game activation and deactivation in order to offer selected authorized games to the players at predetermined authorized times may be achieved by simply enforcing the associated Software Restriction Policies at a given time; this may be accomplished by having an operator manually enforce the SRP at a predetermined time via the group policy management console, or having a process automatically enforce the SRP at a predetermined time via the API to the group policy management console. Enforcing a policy may be achieved by linking the selected policy to the selected policy object in the domain controller active directory. Alternatively, a selected executable software component may be prevented from executing by configuring its associated SRP security level to "disallowed".

Figure 9:
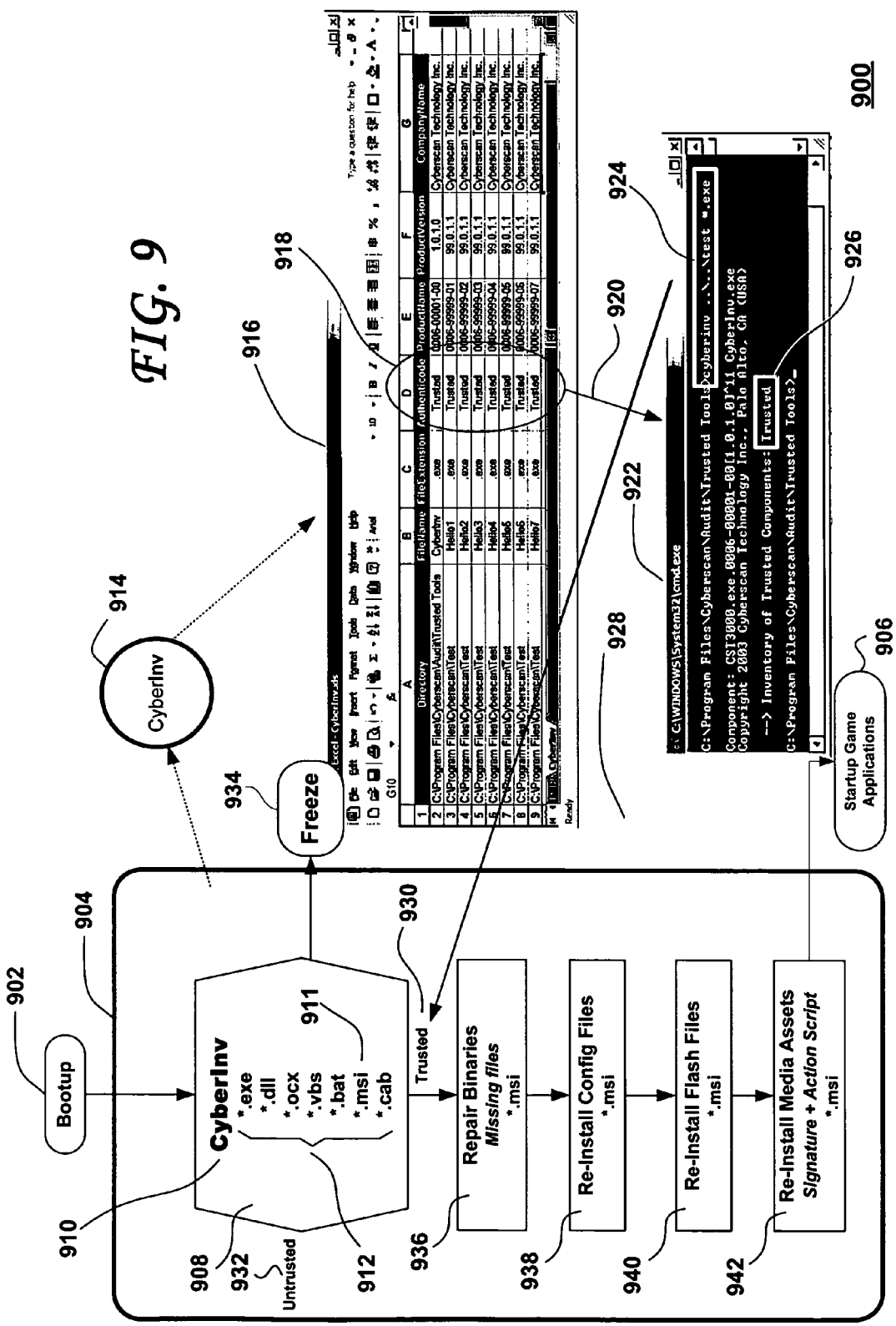
FIG. 9 illustrates the global verification process performed by the terminal in order to check that no unauthorized file may execute or may affect game outcome, according to an embodiment of the present invention.

At this stage, a global verification process 842, 844 as described relative to FIG. 9 may advantageously be executed to verify the trust of every software component installed on the gaming terminal. Should the global verification fail, the gaming terminal may be locked at 846 pending servicing by an attendant.

When a player selects a game from a gaming terminal 838 from a selection menu and requests execution thereof, as shown at 848, the authenticodes of the game's executable software components are verified by the associated enforced Software Restriction Policy as shown at 850 before beginning execution 858. Should the authenticode verification fail at 852, the gaming terminal may be locked at 854 pending servicing by an attendant. If the code is trusted, as verified by the associated enforced SRP, the game is allowed to execute, as shown at 858.

Policy changes are automatically distributed by the Windows server operating system throughout the network connected gaming system at periodic intervals; this automatic process may be disabled if required. Alternatively, the RegisterGPNotification function may be used by the game application software executing on each gaming terminal to check if an applicable group policy has changed. The gaming terminal may then decide on enforcing the policies locally immediately. The gpupdate.exe service, the RefreshPolicy function or the RefreshPolicyEx function may be used by the game application software executing on each gaming terminal to enforce the configured policies. A reboot may optionally be performed in order to recheck the gaming terminal trusted base and ensure the policies have been completely enforced (long game installation for example).

The RegisterGPNotification function enables an application to receive notification when there is a change in policy. When a policy change occurs, the specified event object is set to the signaled state. Further information on the RegisterGPNotification function may be found at: http://msdn.microsoft.com/library/default.asp?url=/library/en-us/policy/policy/registergpnotification.asp. The RefreshPolicy function causes policy to be applied immediately on the client computer. Further information on the RefreshPolicy function may be found at: http://msdn.microsoft.com/library/default.asp?url=/library/en-us/policy/policy/refresh policy.asp. The RefreshPolicyEx function causes policy to be applied immediately on the computer. The extended function allows specifying the type of policy refresh to apply to be specified. Further information on the RefreshPolicyEx may be found at http://msdn.microsoft.com/library/default.asp?url=/library/en-us/policy/policy/refreshpolicyex.asp.

The menu of authorized games offered to the player may be dynamically generated by each terminal without requiring the central system to dispatch the list of authorized games or having each terminal fetch the list of authorized games from the central system; this may be done by having each terminal check the policies enforced on the games. This may be accomplished by having a process in each terminal attempt to execute each of the entry point for each game (the parent module which is first called upon selecting a game to play). If the execution succeeds, then the game is authorized and may be added to the games menu offered to the player. If the execution is denied (SRP is unlinked or the security level is disallowed), then the game is not authorized and it is removed from the games menu offered to the player. Similarly, if a game entry software component file is not found, then the software is not installed or has been removed and is removed from the games menu offered to the player. The process of dynamically generating the game selection menu may be optimized in many ways in order to reduce the game time to start overhead to check if it is authorized.

In a casino, although new games may be scheduled to be downloaded to gaming terminals and activated at predetermined times, it is a requirement that games may not be changed while a player is playing. In practical terms, a player is considered to have terminated his or her game play when the player's credit balance remains at zero for a predetermined period of time. The predetermined period time is sufficient for allowing the player to enter a new bill or other form of credit instrument to continue playing. Therefore, the game application software on each game terminal may, according to embodiments of the present invention, continually test for this condition (credit=0 for a predetermined time) before checking for change in policy, enforcing the policy changes and then updating the menu of games to be made available to the next player.

FIG. 9 at 900 illustrates the global verification process performed by a terminal to check that no unauthorized files are allowed to execute or affect the game outcome. This process may be performed by any of the subsystems connected in the gaming systems.

The process may start with a computer cold or hot reboot 902 such that the operating system trusted base may be thoroughly verified before the game software components are verified. The trusted base is detailed in commonly assigned and copending US application Ser. No. PCT/US2002/029927, entitled "Secure Game Download", the specification of which is incorporated herein by reference, and also in Microsoft Next Generation Secure Computing Base (NGSCB), also incorporated herein by reference. Details of Microsoft's NGSCB are located at www.microsoft.com/ngscb. During the trusted base verification, the integrity of the Driver Signing framework, the Windows File Protection framework and Software Restriction Policies framework are verified. With NGSCB operating system such as forthcoming "Longhorn", a framework called Nexus deeply integrated directly within the hardware components (in each major chipsets) and the BIOS which constitutes a mechanism for authenticating the trustworthiness of the software and hardware configuration, is booted prior to checking the integrity of the Driver Signing framework, the Windows File Protection framework and Software Restriction Policies framework.

On completion of the operating system boot-up 902 or at another time, the global verification process 904 may be executed. The CyberInv process 910, 914 is also shown and described at FIG. 5. The CyberInv process 910, 914 verifies all the executable files in given folder trees such as 912 (*.exe, *.dll, *.ocx, *.vbs, *.bat, *.msi, *.cab, for example) for trustworthiness. If any file is found to be untrusted as shown at 932, then the gaming terminal may be frozen as shown at 934 pending examination by security personnel. A spreadsheet file 916 may be produced that list the verification status of each executable file. If the authenticode of all the files is trusted as shown at 918 then the CyberInv process 908, 910, 914, 924 returns at 920 a trusted status, as shown at 926 930. Consequently, all of the executable software components may be considered to be trusted, as shown at 930.

However, it is to be noted that the fact that an executable software component is trusted does not imply that the software component is authorized to execute; it merely indicates that the software executable software component has a valid authorized authenticode certificate and that the software component binary data is not corrupted. Checking whether an executable software component having a valid authorized authenticode certificate is authorized to execute requires that the applicable Software Restriction Policy be checked. This may be performed automatically when the software component is loaded by the operating system to start its execution, either when dynamically building the menu of authorized games, or each time upon starting execution of the game when the player has selected a game to play—or using an appropriate service that may be called by an application.

Although RM (Rights Management) and DRM (Digital Rights Management) technology from Microsoft is readily available for authenticating the trustworthiness of non-executable files such as media files, Word files and emails, for example, it adds management complexity on top of the Software Restriction Policy framework when used in a network-connected gaming system. Addressing this, embodiments of the present invention offer a method for a network connected gaming system to trust non-executable files such as initialization or configuration files, video files, sound files, multimedia files, file containing list of hashes, CRCS, and/or signatures. The present method relies on packaging the non-executable files in a MSI installation package, the MSI package being subsequently code-signed with a unique certificate and the appropriate Software Restriction Policy is configured to enable installation (execution in fact) of this MSI package. Executable files and non-executable files may be packaged together for convenience. The selected aggregate of executable files and non-executable receives at least a part number (and preferably a version number as well) that is used in the subject name of the associated certificate. Consequently, according to embodiments of the present invention, when the MSI package is installed, the installed non-executable files are obtained from a trusted and authorized source.

As the CyberInv process 908 has authenticated the trustworthiness of all the *.msi files 911, therefore whenever there is a need to ensure that the non-executable files are trusted, the associated MSI package is re-installed. It is to be noted that the service that performs the installation of the MSI packages (msiexec.exe in the current versions of Windows) may be executed with a variety of execution modifiers, such as shown at http://www.microsoft.com/technet/treeview/default.asp?url=/technet/prodtechnol/winxppro/proddocs/msiexec.asp. Of particular interest is the c option that reinstalls a file if it is missing or if the stored checksum of the installed file does not match the new file's value (the log file will contain the anomalies detected for subsequent forensic analysis), as shown at 936. In the global verification process 904, the c option of the msiexec.exec command may be used for re-installing every package containing configuration files 938 (such as initialization or configuration files, files containing list of hashes, CRCs, and/or signatures), Flash files 940 (Macromedia Flash and Director), and other media assets files 942 in order to ensure the trustworthiness of these files.

Subsequent to completion of process 908, all the MSI packages for the executable software components may be re-installed with for example, the msiexec.exe command using the p option in order to re-install missing authorized executable software components (the log file will contain the anomalies detected for subsequent forensic analysis).

Subsequent to the successful completion of the global verification process 904, the trustworthiness of the game application framework is established and may be started, as shown at 906.

It is to be noted that when a player wins an amount equal to or greater than $25,000 in a casino, there is a requirement to check the integrity of the gaming application. With legacy gaming terminals, the gaming terminal is powered-down and the ROMs are extracted in order to be verified in a trusted verifier named a "Kobetron". The Kobetron produces a signature for each of the ROMs that is compared with the corresponding signature produced by the game certification laboratory. In this manner, the integrity of the all the software components of the legacy gaming terminal, including the operating system, the game application and the configuration data may be verified. According to embodiments of the invention, when executing the global verification process 904 subsequent to the gaming terminal bootup at 902, a verification equivalent to a "Kobetron verification" may be performed. This metaphor helps greatly in the acceptability of downloadable game technology by game regulators who are reluctant to accept state-of-the-art operating systems, multimedia and network technologies.

Figure 10:
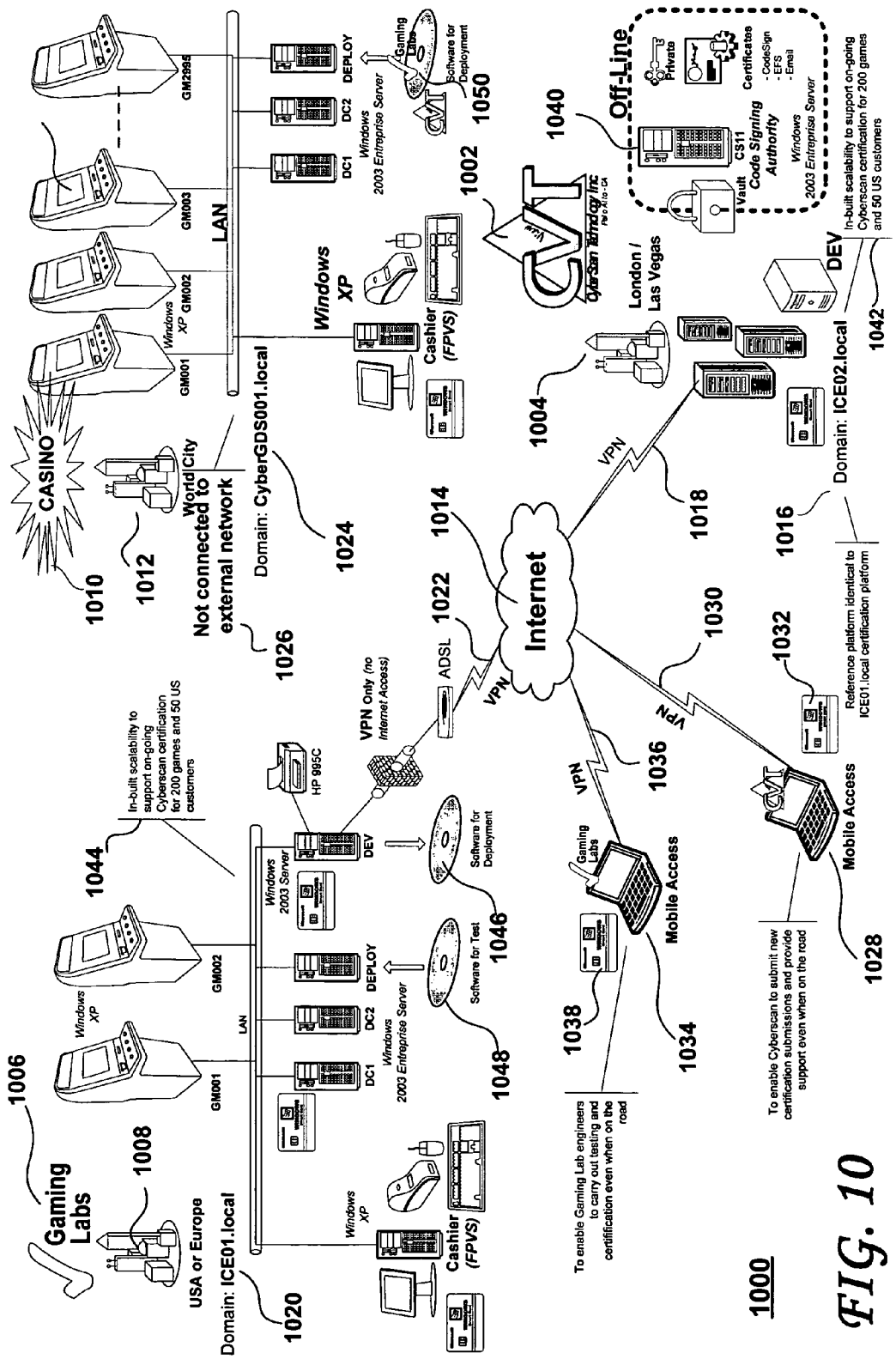
FIG. 10 illustrates the configuration of the three parties involved in a new game cycle detailed at FIG. 8, according to an embodiment of the present invention.

FIG. 10 at 1000 illustrates the configuration of the three parties involved in a new game cycle detailed at FIG. 8, according to an embodiment of the present invention. The three parties involved in a game cycle, according to embodiments of the present invention, are the game developer 1002 whose facilities are located in a given city 1004, the game certification laboratory 1006 whose facilities are located in a given city 1008 and the gaming operator 1010 located in a given city 1012. The game developer 1002 and the game certification laboratory 1006 may have a network 1020 of connected gaming system(s) representative of the network connected gaming system in place at the location (e.g., the casino) of the gaming operator 1010. In addition, the game developer 1010 and the game certification laboratory 1006 each may have an integrated software development environment for compiling the game applications source code, each capable of managing at least 200 games for 50 distinct game operators as shown at 1044, (resulting in thousands of source code variants due to local regulation variances). The development environments may be kept synchronized via the secure network link 1016, 1018, 1014, 1022, 1020. A certification authority (CA) 1040 may be located at the game developer's site or may be controlled by an authorized trusted party such as VeriSign. The game developer site and the game certification laboratory site may be accessible from the outside by authorized mobile users 1034, 1028 via secure links 1022, 1018, 1030, 1036. Logon authentication may be carried out using, for example, smartcards as shown at 1038, 1032 or by other secure means.

According to one embodiment of the present invention, the game developer 1002 may supply the game certification laboratory 1006 with a CD-ROM (or other media) containing the software components to be tested, as shown at 1048. The game certification laboratory then certifies the software components supplied on the CD-ROM and provides the game developer 1002 with a CD-ROM containing the certified software components for deployment, as shown at 1046. The CD-ROM 1046 containing the authorized software components that were tested and certified by the game certification laboratory 1006 may then be provided to the game operator (e.g., the casino) for installation and deployment on one or more of the gaming machines GM001, GM002, GM2995 coupled to the network 1024. The certified authorized software components are code-signed using a certificate produced in accordance with an embodiment of the present invention, as described hereinabove. The network 1024 is preferably not coupled to any external network, as suggested at 1026.

Figure 11:
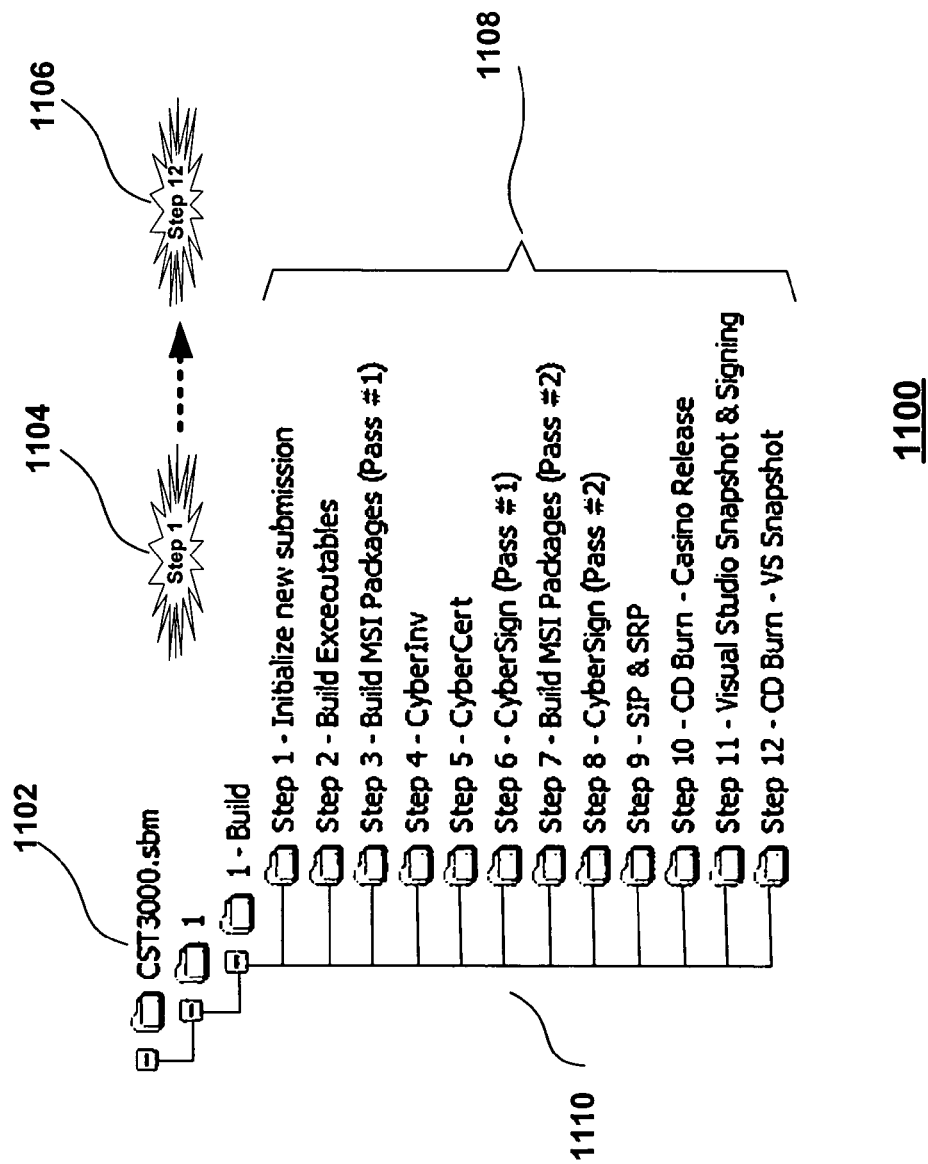
FIG. 11 illustrates the 12 folders created on the disk repository of the development environment, according to an embodiment of the present invention.

FIG. 11 shows a 12-Step Integrated Certification Environment Process, according to an embodiment of the present invention. Shown at 1100 are the 12 folders 1110 created on the disk repository 1102 of the development environment. The 12 folders 1110 are mapped to the 12-step procedure 1104 to 1106 involved in producing the CD-ROM 1050 containing the certified authorized software components. Each folder contains the computer resources and instructions to carry out each step. The folders are clearly named with the step number and the title description of the procedure step at 1108.

Figure 12:
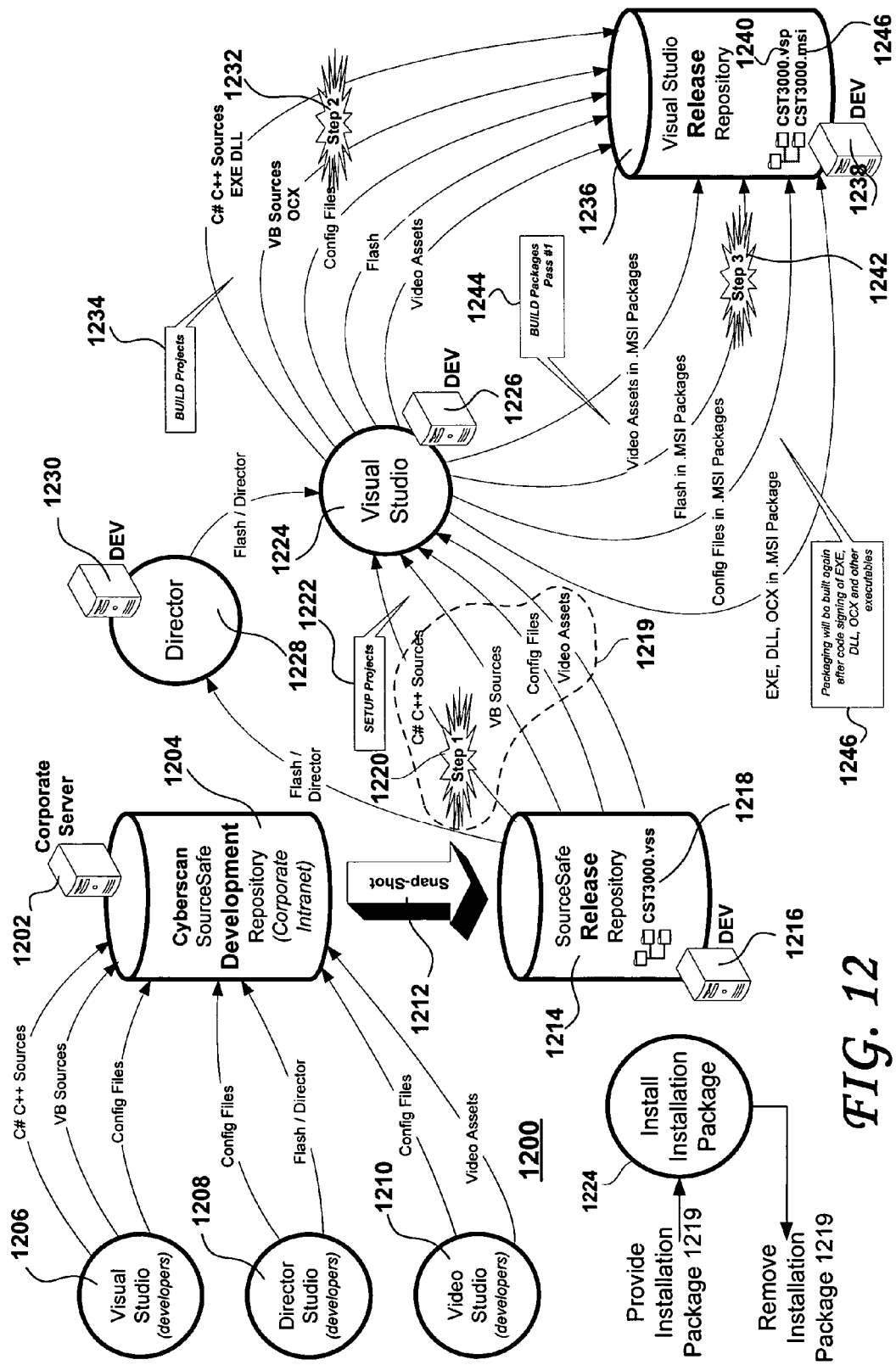
FIG. 12 illustrates the dataflow for step 1 to step 3 for producing the certified authorized software components, according to an embodiment of the present invention.

FIG. 12 shows a dataflow diagram of Step #1 to Step #3 of the Integrated Certification Environment Processor for producing certified authorized software components, according to an embodiment of the present invention. Step 1 at 1220 may include obtaining a snapshot 1212 of the repository 1204 containing the game developer's source code 1206, data files 1208 and media assets 1210 in order to configure the building environment of the reference platform with all the source code, data files, media asset files and resources files required to initiate the certification process. The snapshoot files 1212 may be stored in a repository 1218 controlled by a version configuration and control system (SCCS) such as Microsoft Visual Source Safe 1214 (VSS) on the DEV development computer 1216. The files may be grouped in project directories as "Projects" such that the source files, control files and resource files are stored in convenient systematic fashion in the Visual Studio repository 1240 on the development computer 1238. An inventory of the files submitted for certification may be produced. Step 1 may be qualified as "SETUP Projects" 1222.

Alternatively and according to an embodiment of the present invention, the gaming developer may provide the game certification laboratory with only the source code that is to be certified. As set out above, such source code may be provided to the game certification laboratory on a CD or other tangible medium containing the software to be certified stored thereon. Alternatively and according to another embodiment of the present invention, the source code to be certified, along with any related files may be packaged in an installation package, shown at 1219 in FIG. 12, that binds together all of the source code to be certified and ancillary files including data files, installation scripts or directives, VB sources, configuration files and video assets, for example. The installation package 1219 may receive a distinct certificate bound to its content by a code signing operation. The attributes of such installation package 1219 may be defined so as to indicate the installation package's destination (e.g., Visual Studio environment at the certification lab). Therefore, instead of sending both source code and the corresponding executables (including binary files and other files created through the compilation process) to the game certification laboratory as shown at Step 1 1220 in FIG. 12, only the source code (together with the ancillary files) may be sent to the certification lab. Moreover, such source code and ancillary files may be packaged within an installation package 1219 secured by a (e.g., PKI) certificate. Indeed, the installation package 1219 may be a code-signed installation package signed a unique PKI certificate from a trusted issuing authority. The installation package 1219 may be executed, within the certification lab's environment, using an action script or directive that was packaged within the installation package. The action script may be configured to control the installation process (or alternatively, carry out updates or uninstall operations) of the packaged source code in an orderly and controlled fashion. After the installation package 1219 has been installed within the gaming certification lab's development environment, the remaining steps 2-12 of FIGS. 12 and 13 of the certification process may be carried out, as described elsewhere herein. After the certification process is finished, the installation package 1219 may be removed from the certification lab's source code management environment, again according to one or more action scripts packaged within the installation package 1219 originally sent to the certification lab. The removal process preferably removes all source code, executable and ancillary files related to the submission from the certification lab's code management environment. To carry out the removal in an orderly and controllable fashion, action scripts included in the original installation package 1219 submission (or provided later) may be executed to remove and/or delete all files related to the compilation process carried out during the course of the certification process. Both the installation and eventual removal of the installation package 1219 may be carried out by the certification lab. Step 1 at 1220 in FIG. 12 may also include a step of executing the installation package, to provide the game certification laboratory with the source code to be certified.

According to an embodiment of the present invention, the installation package 1219 may include an installation package from Microsoft Corporation, such as an .MSI package. Preferably, the installation package is not limited to the Windows® operating system, but is also compatible with other operating systems, such as UNIX and LINUX. The installable submission package provided to the game certification laboratory may include a file name identifier that may reflect the certification process thread and stage, that is, may denote the customer, the applicable regulation, initial submission, bug fix, regulatory variant, retirement, etc. The file name identifier may advantageously be or include a text string comprising the relevant explicit codes and/or a GUI (Global Unique Identifier) associated to the applicable certification process details. An installer utility may allow the game certification laboratory to unpack the package provided by the game developer and to execute any included directives or scripts (such as, for example, installation, updating or uninstalling of source code and any associated files). In the case of an update, the old source code (and related files) may be advantageously cached in a structured manner such that a given update may be undone, if requested.

It is to be noted that Steps 2 to 12 may be automated using, for example, the automation API of Microsoft Visual Studio 2003 (or MS-Visual Studio 2005, also known under its code name Whidbey. Step 2 at 1232 may include compiling the source code and producing binary executable code. Microsoft Visual Studio 1224 is constructed so as to manage source code as projects (a project can be a given game) regrouping all of the dependent source code, and data files. Step 2 is also referenced as building the projects or "BUILD Projects", as shown at 1234. Media assets may require a different compiling environment on the DEV computer 1230 such as the Macromedia Director 1228.

Step 3, shown at 1242 may include producing the project's MSI packages 1244 for the source code compiled in Step 2. Relevant non-executable file such as configuration files and media assets may be packaged in MSI packages with the compiled source code. It is to be noted 1246 that packages will be built again (step 8 hereafter) after code signing of EXE, DLL, OCX and other executables (step 6 hereafter). Step 3 may be referenced as "BUILD Packages Pass #1" 1244.

Figure 13:
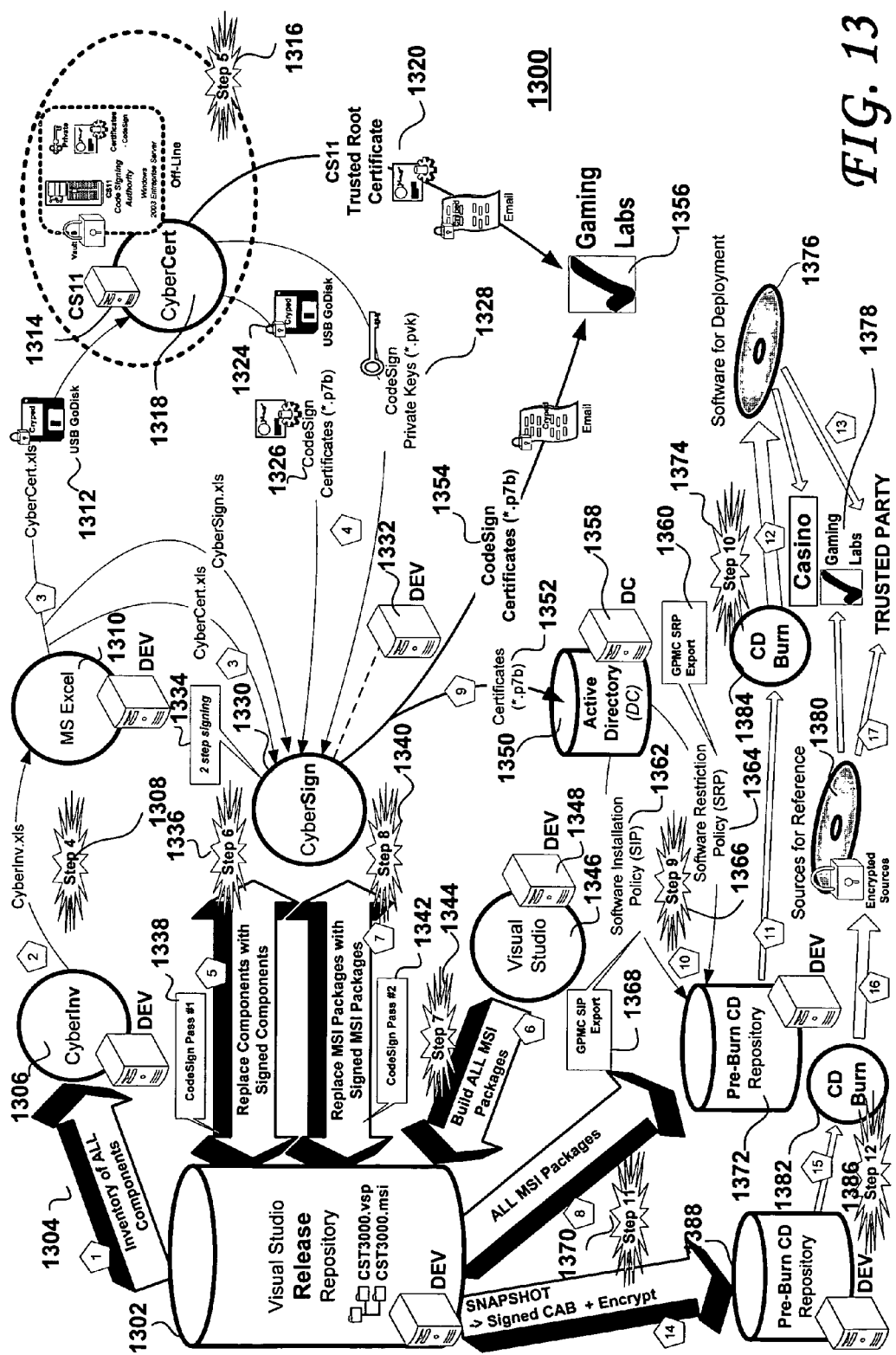
FIG. 13 illustrates the dataflow for step 4 to step 12 for producing the certified authorized software components, according to an embodiment of the present invention.

FIG. 13 shows, at 1300, the dataflow for step 4 to step 12 for producing the certified authorized software components, according to an embodiment of the present invention. Step 4 at 1308 calls for the CyberInv.exe process 1306, for a selected project (a Visual Studio project may typically regroup all the software components for an entire game), perform an inventory 1304 of the compiled software components produced by Visual Studio 1302 on completion of the Build Project process 1234 (FIG. 12) as well as the MSI install packages produced by the Build MSI Packages Pass #1 1244 process (FIG. 12). The CyberInv.exe 1306 process may also include any other executable software components not directly managed under Visual Studio such as, for example, ocx, *.vbs, *.bat, *.cab, *js. (in fact, any executable component that is supported by the Software Restriction Policy technology).

The CyberInv.exe process 1306 produces the CyberInv.xls 1307 Excel spreadsheet file 916 shown at FIG. 9, which is examined by an authorized user in the MS Excel program 1310. The CyberInv.xls 1307 file is copied to the folder "Step 4—CyberInv" folder in 1110 in FIG. 11. The binary files having just been compiled are not code-signed; consequently the authenticode field shows an "Untrusted" status for each of the binary components. The friendly name, file type, part number and version (including build number) are extracted directly from the assembly information contained in the source code, therefore truly reflecting the identity of the source code component.

Because the build number is incremented each time the code is recompiled in a Build operation, it is to be noted that the version number will change accordingly. The authorized user eliminates the rows that are irrelevant to the game to be certified and saves the file under the CyberCert.xls 1311 file name which contains the necessary friendly name 512, executable type 514, part number 518 and version 520 information to compose the PKI certificate subject name in accordance with method detailed at FIG. 3 for subsequent code signing. The program path location 510 of the unsigned software components is also available for later retrieval of the unsigned binary file. The CyberCert.xls 1311 file is copied to the folder "Step 5—CyberCert" folder in 1110 in FIG. 11.

The CyberCert.xls 1311 file may be securely copied in encrypted form to a removable media such as a floppy disk, a CD-ROM or a USB disk 1312, or alternatively transferred to another location by secure communication means.

The CyberCert.xls 1311 file is split into 2 files CyberSign1.xls 1317 and CyberSign2.xls 1319. CyberSign2.xls contains only the rows associated to the MSI packages and CyberSign1.xls contains the rows corresponding to the other executable file. CyberSign1.xls is copied to the "Step 6—CyberSign (Pass #1)" folder in 110 in FIG. 11, and CyberSign2.xls is copied to the "Step 8—CyberSign (Pass #2)" folder.

Step 5 at 1316 includes having a certification authority (CA) 1315 located at the game developers' site or controlled by an authorized trusted party such as VeriSign generating certificates in accordance with the details provided in the CyberCert.xls 1311 file, that is, with a subject name created in accordance with the method detailed relative to FIG. 3. An automated process CyberCert.exe 1318 executing on the offline CA computer Windows server named CS 11 1314 may automate the generation of the PKI public certificates 1326 and the associated private keys 1328 using the CyberCert.xls 1311 file.

The trusted root certificate for the authorized CA 1320 is supplied to the certification lab, the game regulators or other parties for reference and for importing as a trusted root into the ICE computer system and the gaming system certificates store.

The public certificates 1326 and their associated private keys 1328 are forwarded to the DEV computer 1332 of the ICE system in encrypted form on a removable media such as a floppy disk, a CD-ROM or a USB disk 1324, or alternatively transferred by secure communication means. Public certificates 1326 and their associated private keys 1328 that are associated with the MSI packages are copied into the "Step 6—CyberSign (Pass #1)" folder in 1110, and the other public certificates 1326 and their associated private keys 1328 that are associated with other software components are copied to the "Step 8—CyberSign (Pass #2)" folder.

Step 6 1336 includes steps of code signing the non-MSI executable components listed in the CyberSign1.xls 1317 file using the corresponding public certificates 1326 and their private keys 1328. The code signing may be performed using the SignCode.exe utility provided by Microsoft, or equivalent. A password may be required for the private key depending on the security option selected when generating the certificate at the CA. The CyberSign.exe process 1330 may automate the code-signing of all the non-MSI executable components listed in the CyberSign1.xls 1317 file using the friendly name, file type, part number and version (including build number) given in each row. The CyberSign.exe process may call the SignCode.exe utility or the equivalent API. During the code signing process, the compiled executable software components may be replaced at 1339 by their code-signed form. Step 6 is designated as "CodeSign Pass#1" 1338.

Step 7 at 1344 includes re-building all the MSI install packages 1345 performed during step 3 at 1242. This time, the MSI packages contain the non-MSI code-signed executable components.

Step 8 at 1340 includes code signing the MSI executable components listed in the CyberSign2.xls 1319 file using the corresponding public certificates 1326 and their private keys 1328. The code signing may be performed using the SignCode.exe utility provided by Microsoft, or equivalent. A password may be required for the private key depending on the security option selected when generating the certificate at the CA. The CyberSign.exe process 1330 may automate the code-signing of all the MSI executable components listed in the CyberSign2.xls 1319 file using the friendly name, file type, part number and version (including build number) given in each row. The CyberSign.exe process may call the SignCode.exe utility or the equivalent API. During the code signing process, the executable MSI software components may be replaced 1341 by their code-signed form. Step 8 is designated as "CodeSign Pass#2" at 1342. The executable MSI software components are copied as shown at 1371 to the CD Pre-Burn repository 1372.

Because of the necessity of performing step 7, the CyberSign 1330 code-signing process to be used for the ICE (Integrated Certification Environment) is designated a "2-Pass code-sign", as indicated at 1334.

Step 9 1366 includes (a) configuring the software restriction policy (SRP) 1360 for the ICE system test gaming terminals (via the active directory 1350 in the domain controller DC) with the certificate rules corresponding to the certificate produced at step 5 (the *.p7b certificate at reference numeral 1326 may be converted to *.cert certificates for compatibility reasons when configuring the SRP); (b) configuring the Software Installation Policy (SIP) 1368 for the ICE system test gaming terminals with the MSI packages produced at step 7, then (c) using the GPMC (Group Policy Management Console) or equivalent service, exporting the SIP via SIP export scripts 1362 and the SRP via SRP export scripts 1364 (the policy export facility is available in the Group Policy Management Console GPMC 702, 704). These SIP and SRP export scripts may be copied into the folder "Step 9—SIP & SRP" folder in 1110. These SIP and SRP export scripts may be later imported in the gaming operator's 1010 gaming system for enforcing the policies on the game components. SIP export scripts 1362 and SRP export scripts 1364 are stored in the CD Pre-Burn repository 1372 (or into the folder "Step 10—CD Burn—Casino Release" folder in 110).

Step 10 at 1374 includes steps of burning at 1384 to a CD-ROM 1376 or other removable media the content of the CD Pre-burn repository 1372 comprising (a) the executable MSI software components 1371; (b) the SIP export scripts 5 1362 and SRP export scripts 1364 and (c) other automation scripts in order to automate the installation of (a) and (b). A copy of CD-ROM 1376 may be forwarded (a) to the gaming operator's 1010 gaming system for game deployment (such as a casino 1379), (b) to the game certification laboratory 1378, and (c) a trusted party 1377 such as a lawyer or in escrow for impartial reference in case of later dispute. The CD-ROM 1376 may later be inserted at 1050 in the gaming operator's 1010 gaming system for game deployment.

Step 11 at 1370 includes steps of (a) taking a snap-shot 1387 of the entire development environment for a selected certified game (Visual Studio repository 1302 and Visual Source Safe repository 1214 1218 that contains all the source file, the compiled code-signed executable files and dependant executable files, the non-executable. files, project solution, automation scripts, the source and compiled signed code from other development platforms, the media assets from media development platforms such as MacroMedia Director 1228); in (b) taking a snap-shot 1387 of the code-signed MSI installation packages; in (c) optionally encrypting them; and then in (d) copying them into a CD pre-burn repository 1388 (or into the folder "Step 12—Burn—VS Snapshot" folder in 1110).

Step 12 at 1386 includes steps of burning at 1382 to a CD-ROM 1380 or other removable media the content of the CD Pre-burn repository 1388 comprising the software components of step 11. A copy of CD-ROM 1380 may be forwarded to the game certification laboratory 1378 and to a trusted party 1377 such as a lawyer or in escrow for impartial reference in case of later dispute.

Steps 4 to step 12 should be carried out each time a source code is being recompiled subsequent to a modification because a unique certificate must be associated to each build. Deviating form this order may jeopardize certificate integrity because of the risk of a human error that may result in the wrong certificate being used during the code signing process.

Figure 14:
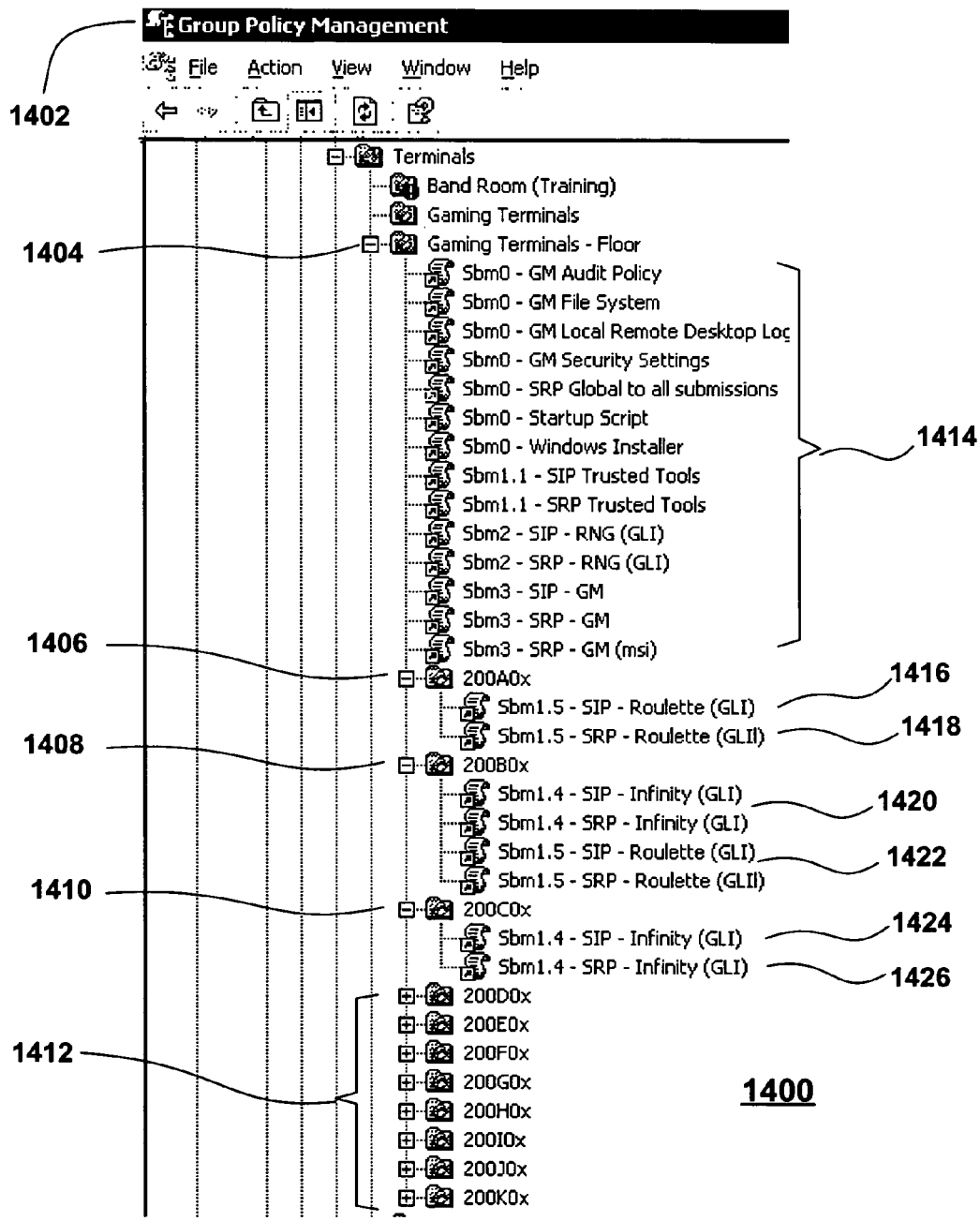
FIG. 14 illustrates the grouping of gaming terminals and the associated enforced policies, according to an embodiment of the present invention.

FIG. 14 illustrates assignment of policies by banks of gaming machines. Reference numeral 1400 in FIG. 14 shows the grouping of gaming terminal and the associated enforced policies. In this illustration, the Group Policy Management console 1402 may be configured such that the active directory Organization Unit (OU) named "Gaming Terminals—Floor" at 1404 is architectured to regroup the gaming terminals in "banks" or sub-Organization Units (sub-OUs) identified by 200A0x 1406, 200B0x 1408, 200C0x 1410, and 200D0x to 200K0x at reference numeral 1412. Each bank contains a predetermined number of gaming terminals, in multiples of 8 units, for example.

Noting the hierarchical tree composed of the OUs and sub-OUs illustrated at 1400, all the policies 1414 apply to the OU "Gaming Terminals—Floor" 1414 which contains all the sub-OUs 1406 1408 1410 and 1412. Using this technique, all the policies 1414 may apply to all the 3000 gaming terminals of a large casino. In the same manner, the policies 1416, 1418 apply to the bank 1406; the policies 1420, 1422 apply to the bank 1408; and the policies 1424, 1426 apply to the bank 1410.

In the illustration, the exemplary game named "Roulette" is assigned a policy named "Sbm1.5—SIP—Roulette (GLI)" 1416 which configures the Software Installation Policy (SIP) and a policy named "Sbm1.5—SRP—Roulette (GLI)" 1418 which configures the Software Restriction Policy (SRP) for that game.

In the same manner, the exemplary game named "Infinity" is assigned a policy named "Sbm1.4—SRP—Infinity (GLI)" 1424 which configures the Software Installation Policy (SIP) and a policy named "Sbm1.4—SRP—Infinity (GLI)" 1426 which configures the Software Restriction Policy (SRP) for that game.

The keyword "Sbm1.4", in this example, denotes the certification submission number 1.4, and the keyword "GLI" denotes the game certification laboratory GLI (Game Laboratories International) approving the Infinity game software.

In the illustration, all of the game terminals regrouped in the bank 200A0x shown at 1406 are, therefore, configured to execute the Roulette game, all the game terminals in the bank 200B0x shown at 1408 are configured to execute the Roulette game and the Infinity game, and all the game terminals in the bank 200C0x shown at 1410 are configured to execute the Infinity game.

Figure 15:
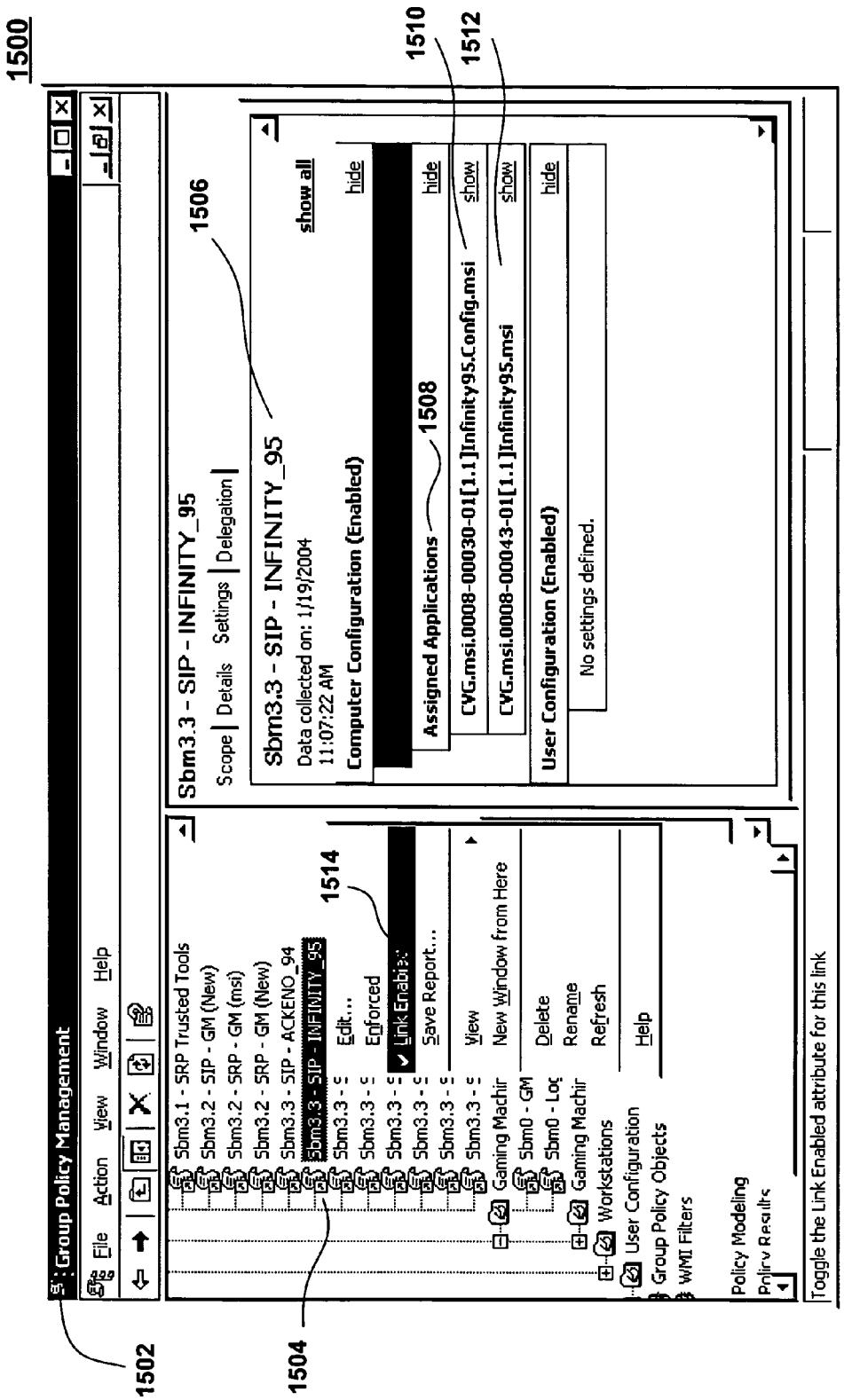
FIG. 15 illustrates a method for enforcing a Software Installation Policy by "linking" the policy, according to an embodiment of the present invention.

FIG. 15 shows the enforcement of a Software Installation Policy (SIP). In FIG. 14, banks of gaming terminals are configured to execute authorized games using SIPs and SRPs policies. However, in order for the gaming terminals to be able to install a game, the associated Software Installation Policy must be enforced. At 1500, FIG. 15 illustrates a method for enforcing a Software Installation Policy by "linking" the policy, according to an embodiment of the present invention. This is accomplished in the Group Policy Management console 1502 by, e.g., right-clicking the selected policy 1504, 1506 "Sbm3.3—SIP—INFINITY_95" associated to the Infinity game with a Return To Players (RTP) percentage of 95% and selecting the "link Enabled" attribute 1514. The software components for the Infinity_95 game contained in the two MSI installation packages 1510 and 1512 will subsequently be installed, provided the associated SRPs are configured to authorize execution of these two MSI packages (refer to description for FIG. 16). Alternatively, the same procedure may be automated via an API called from an appropriate application. It is to be noted that the linking of the policy will in fact enable the enforcement of the policy, but the policy will only be enforced on the gaming terminal when a gpupdate command or equivalent command is performed at the terminal; a terminal reboot may also be required for the policy to be enforced. Also to be noted is that policy changes are automatically distributed by the Windows server operating system throughout the network connected gaming system at periodic intervals; this automatic process may preferably be disabled such as to obtain more predictable policy enforcement changes by issuing explicit commands instead.

Package 1512 (friendly name: Infinity95.msi) contains the executable software components for the Infinity game and package 1510 (friendly name: Infinity95.ConFIG.msi) contains the configuration files (the non-executable files) for the Infinity game. Package Infinity95.ConFIG.msi 1510 is re-installed in the process 938.

Figure 16:
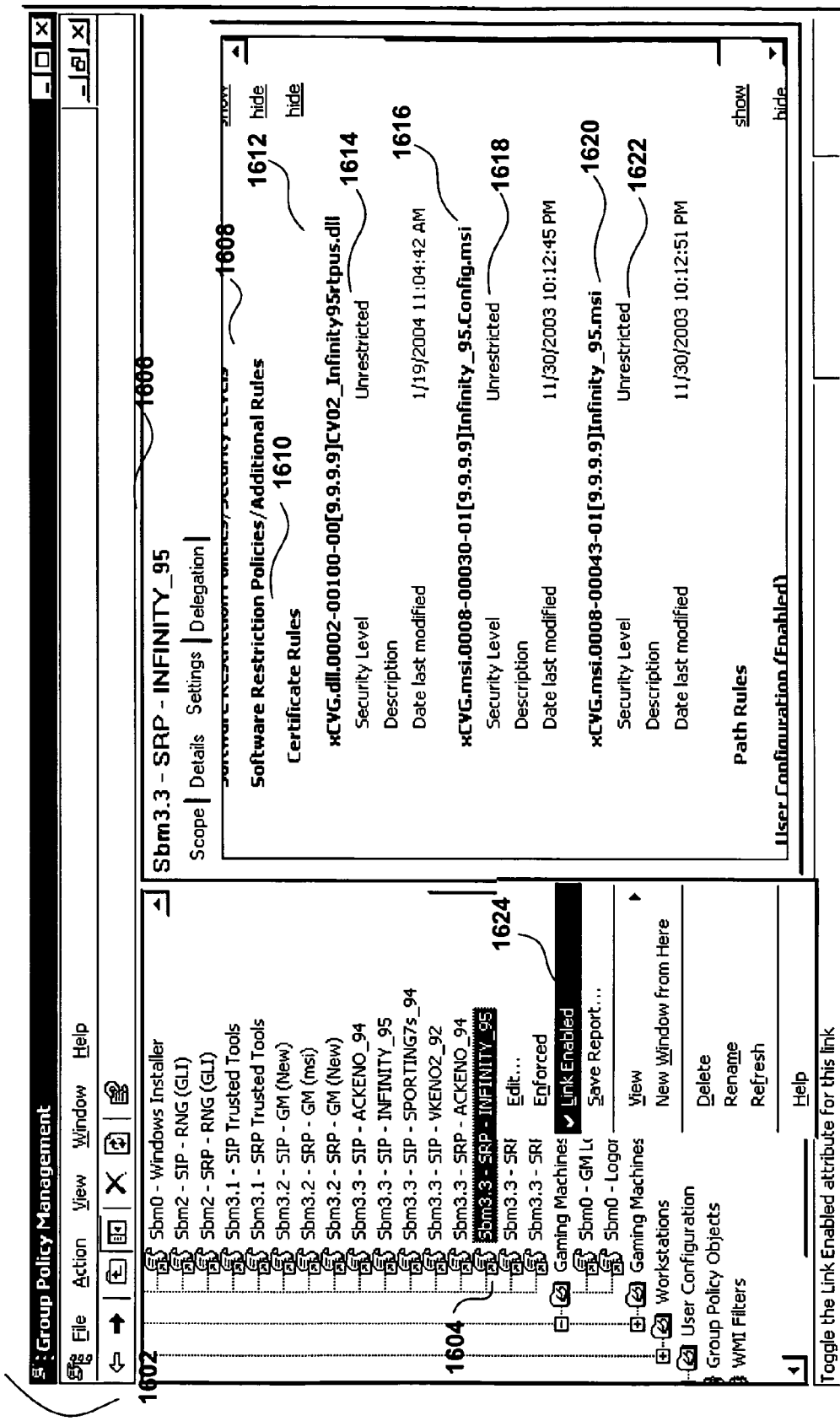
FIG. 16 illustrates a method for enforcing a Software Restriction Policy by "linking" the policy, according to an embodiment of the present invention.

FIG. 16 illustrates the enforcement of a Software Restriction Policy (SRP). In FIG. 14, banks of gaming terminals are configured to execute authorized games using SIPs and SRPs policies. However, in order for the gaming terminals to be able to execute the games, the policies must be enforced. FIG. 16 at 1600 illustrates a method for enforcing a Software Restriction Policy 1608 by "linking" the policy. This is accomplished in the Group Policy Management console 1602 by, e.g., right-clicking the selected policy 1604, 1606 "Sbm3.3—SRP—INFINITY_95" associated to the Infinity game with a Return To Players percentage (RTP) of 95% and selecting the "link Enabled" attribute 1624.

The certificate rules 1610, 1616 and 1620 that are configured with the "Unrestricted" attribute 1618, 1622 authorize the installation of the software components for the Infinity_95 game contained in the two MSI installation packages 1510 and 1512 by authorizing the unique PKI certificate associated to those MSI produced in accordance with the present method. The ".dll" executable software component 1612 is authorized, has its security level attribute set to "Unrestricted" and is, therefore, authorized to execute once it is installed.

The two MSI installation packages 1510 and 1512 for installing the software components for the Infinity_95 game have their associated unique PKI certificate 1616 and 1620 (produced in accordance with the method described herein) configured with the "Unrestricted" security level attribute 1618, 1622 via the certificate rules 1610, thus enabling (or authorizing) execution and installation of the software components for the Infinity_95 game.

The ".dll" executable software component contained in the 1512 package has its security level attribute set to "Unrestricted" thus it is authorized to execute once it is installed.

Alternatively, the same procedure may be automated via an API called from an appropriate application. It is to be noted that the linking of the policy will in fact enable the enforcement of the policy, but the policy will only be enforced on the gaming terminal when a gpupdate command or equivalent command is performed at the terminal; a terminal reboot may also be required for the policy to be enforced. Also to be noted is that policy changes are automatically distributed by the Windows server operating system throughout the network connected gaming system at periodic intervals; this automatic process may preferably be disabled such as to obtain more predictable policy enforcement changes by issuing explicit commands instead.

Figure 17:
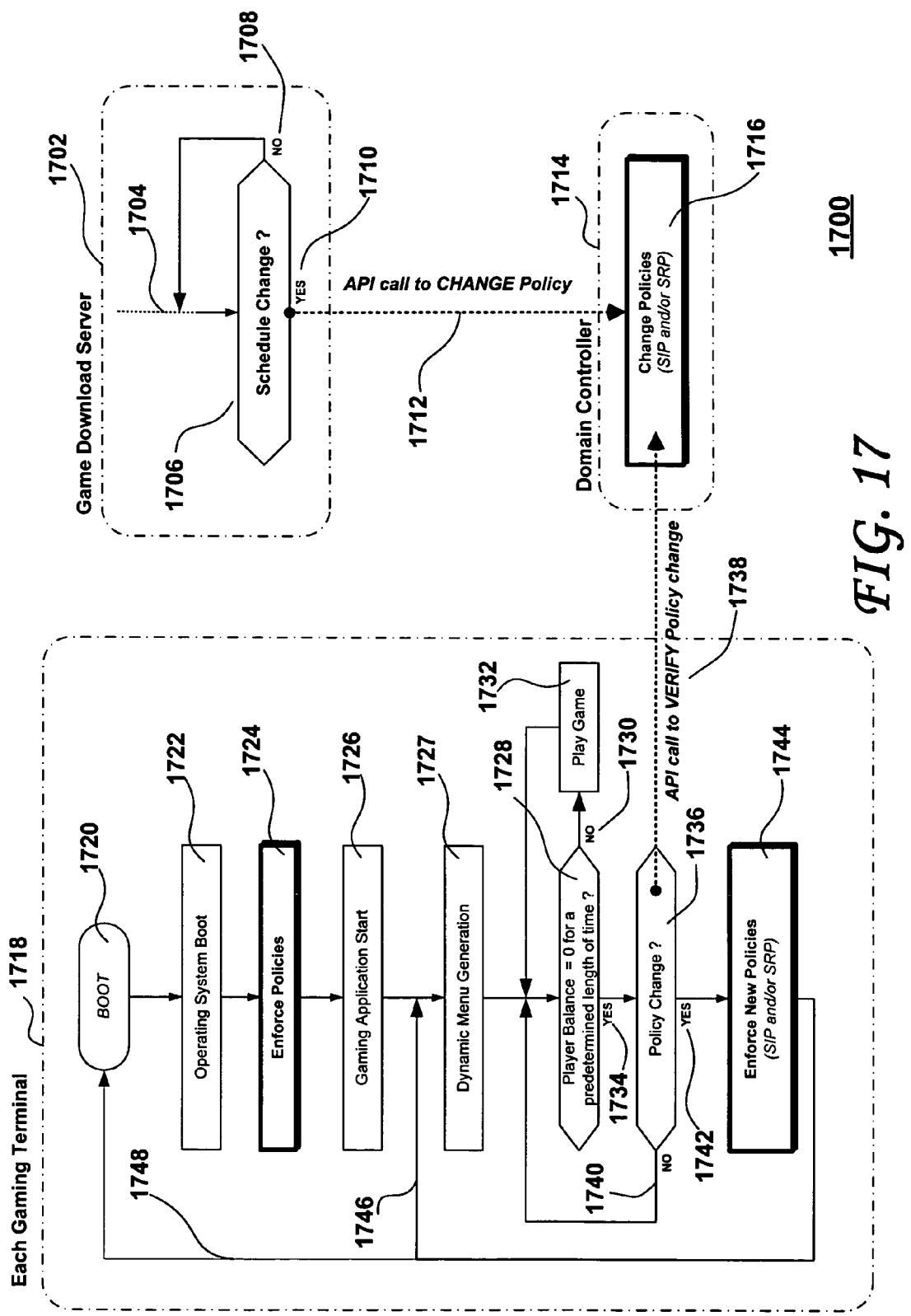
FIG. 17 illustrates the method to enforce a policy at a predetermined time, according to an embodiment of the present invention.

FIG. 17 illustrates a method at 1700 to enforce a policy at a predetermined time, according to an embodiment of the present invention.

Enabling enforcement of policies as described relative to FIG. 15 and FIG. 16 may be carried out interactively by an authorized user at predetermined authorized times, or alternatively may be controlled by a process at predetermined authorized times via the appropriate API. At the central system 1702 (the game download server in this illustration) at a given time 1704, a user or a process may verify a change 1706 in the list of games to be made available to players on a selected set of gaming terminal banks. In case of a schedule change as shown at 1710 (or other reasons such as introducing a new game or revoking an existing game), policies on the domain controller 1714 are being changed accordingly either interactively by a user in the Group Policy Management console as described for FIG. 15 and FIG. 16, or by a process via the equivalent APIs 1712. The changed policies are being enabled for enforcement at 1716 in the domain controller.

In a casino, although new games may be scheduled to be downloaded to gaming terminals and activated at predetermined times, it is a requirement that games are not to be changed while a player is playing. In practical terms, it is considered that a player terminates playing when his or her credit balance remains at zero for a predetermined period of time. The predetermined period time should be sufficient to allow the player to enter a new bill or other form of credit or payment instrument to continue playing. Therefore, the game application software on each game terminal continually tests for this condition (credit=0 for a predetermined period of time) before checking for change in policy, enforcing the policy changes and then updating the menu of games to be made available to the next player.

Upon power-up, each gaming terminal 1718 executes a boot 1720, loads its operating system 1722 and enforces the policies 1724 that are configured at the time of the start-up process. When the game application starts at 1726, it displays a menu of authorized activated games as shown at 1727 to the player using for example the dynamic method described relative to FIG. 19. Whenever the player balance is non-zero 1728, 1730, the player may play as shown at 1732 the games listed on the menu in accordance with the enforced policies. When the player's balance reaches zero at 1734 and remains zero for a predetermined period of time, it is considered that the player is no longer playing. The gaming application of the gaming terminal may then verify at 1736 if a policy has changed 1738. This may be done via the RegisterGPNotification. The RegisterGPNotification function enables an application to receive notification when there is a change in policy. When a policy change occurs, the specified event object is set to the signaled state. Additional details. regarding the RegisterGPNotification function may be found at http://msdn.microsoft.com/library/default.asp?url=/library/en-us/policy/policy/registergpnotification.asp.

At 1740, if there is no change in policy, the games listed on the menu will be unchanged for the next player. If there is a change in policy at 1742, the gaming terminal may enter into a process whereby the policies are enforced as shown at 1744, using for example the gpupdate.com service, the RefreshPolicy function or the RefreshPolicyEx function, or equivalent services or API. It is to be noted that the verification of change in policy and the enforcement of the changed policies may be carried out by each terminal independently.

The RefreshPolicy function causes policy to be applied immediately on the client computer. Additional details regarding the RefreshPolicy function may be found at http://msdn.microsoft.com/library/default.asp?url=/library/en-us/policy/policy/refreshpolicy.asp The RefreshPolicyEx function causes policy to be applied immediately on the computer. The extended function allows specifying the type of policy refresh to apply. Additional details regarding the RefreshPolicyEx function may be found at htt://msdn.microsoft.com/library/default.asp?url=/library/en-us/policy/policy/refreshpolicyex.asp Once the change in policy is enforced at 1744, the gaming terminal may reboot as shown at 1748 or exit and re-enter the gaming application, which would dynamically recreate the menu list of games 1727 to be made available to the next player, as detailed at FIG. 19.

A similar method relying on explicit WMI calls and administrative templates (*.adm) may be applied to obtain the same result in gaming environments whereby the domain controller active directory is not available such is the case with gaming terminals connected in WAN (Wide Area Network) whereby the network bandwidth is limited or the network availability is poor.

An alternative method relying on SMS (System Management Server) code download instead of SIPs (Software Installation Policy) for installing software components and software MSI packages may be used. However, the executable software components remains under SRP (Software Restriction Policy) in accordance with the unique PKI certificate generated for each component as described in the invention.

Figure 18:
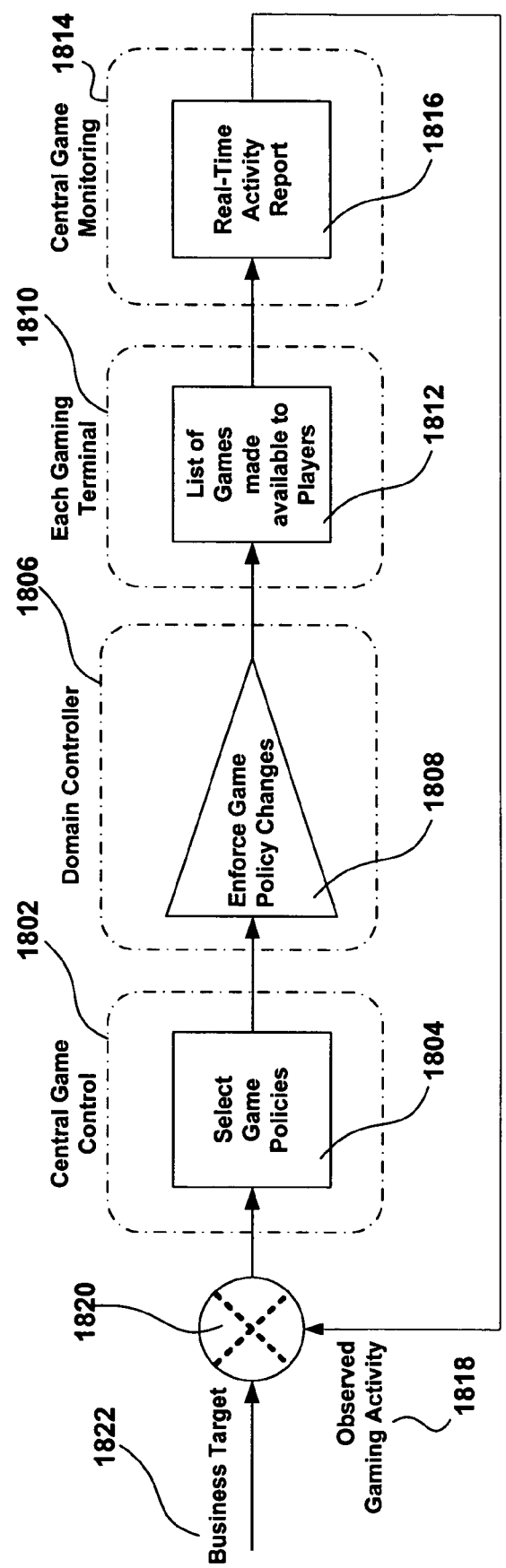
FIG. 18 illustrates the method to enforce a selected policy as the result of observing the gaming activity, according to an embodiment of the present invention.

FIG. 18 shows a close-loop enforcement of a policy, according to an embodiment of the present invention. FIG. 18 at 1800 illustrates a method to enforce a selected policy as the result of observing the gaming activity. The method is directly derived from FIG. 17 whereby the policy change 1716 takes place at 1804 and is selected from a choice of pre-configured policies, for example in a look-up manner, whereby a policy would result in making available to the players a menu of games 1812 (1727 in FIG. 17) to provoke a given gaming activity change which may be monitored in real-time at 1816. The observed activity 1818 may then be compared 1820 to predetermined businesses objectives 1822 and a correction or modification may be applied by selecting a new policy that would change the list of games available on a selected aggregate of gaming terminals 1810. For example, due to a long queue of people who want to play the Infinity game, a greater number of banks of gaming terminals may be configured to make the Infinity game available to players on these terminals. Another reason for applying a new policy might be if a particular area of the casino floor is heavily populated with players while another area is empty. Suppressing some popular games in a highly frequented area and adding them to the less frequently area may help spread the player distribution within the casino or gaming area more evenly. Yet another reason for applying a new policy could be if the gaming activity is low, then games with a higher RTP (return to player), let us say 98% instead of 95%, may be activated in some areas to boost activity.

The process may involve several subsystems as illustrated in FIG. 18: the central game control 1802 wherein policies are selected, the domain controller 1806 that enables enforcement of the policies 1808, a selection set of gaming terminals 1810 wherein each gaming terminal enforces the policies and make the selected games available to the player 1812, a central game monitoring system 1814 that produces activity reports in real time 1816.

The process shown at 1820 of comparing the observed activity 1818 and the targeted activity 1822 and then selecting a change in game policies 1804 may be carried out by the floor manager or the floor director, or alternatively by a knowledge base process. In both cases, a close-loop enforcement of policies (relying on the unique PKI certificate SRP associated to each executable authorized and certified software component) is achieved resulting in the dynamic configuration of the gaming system, either for LAN configurations (such as casino floors) or WAN configuration (such as video lottery terminals distributed across a large geographic area).

Figure 19:
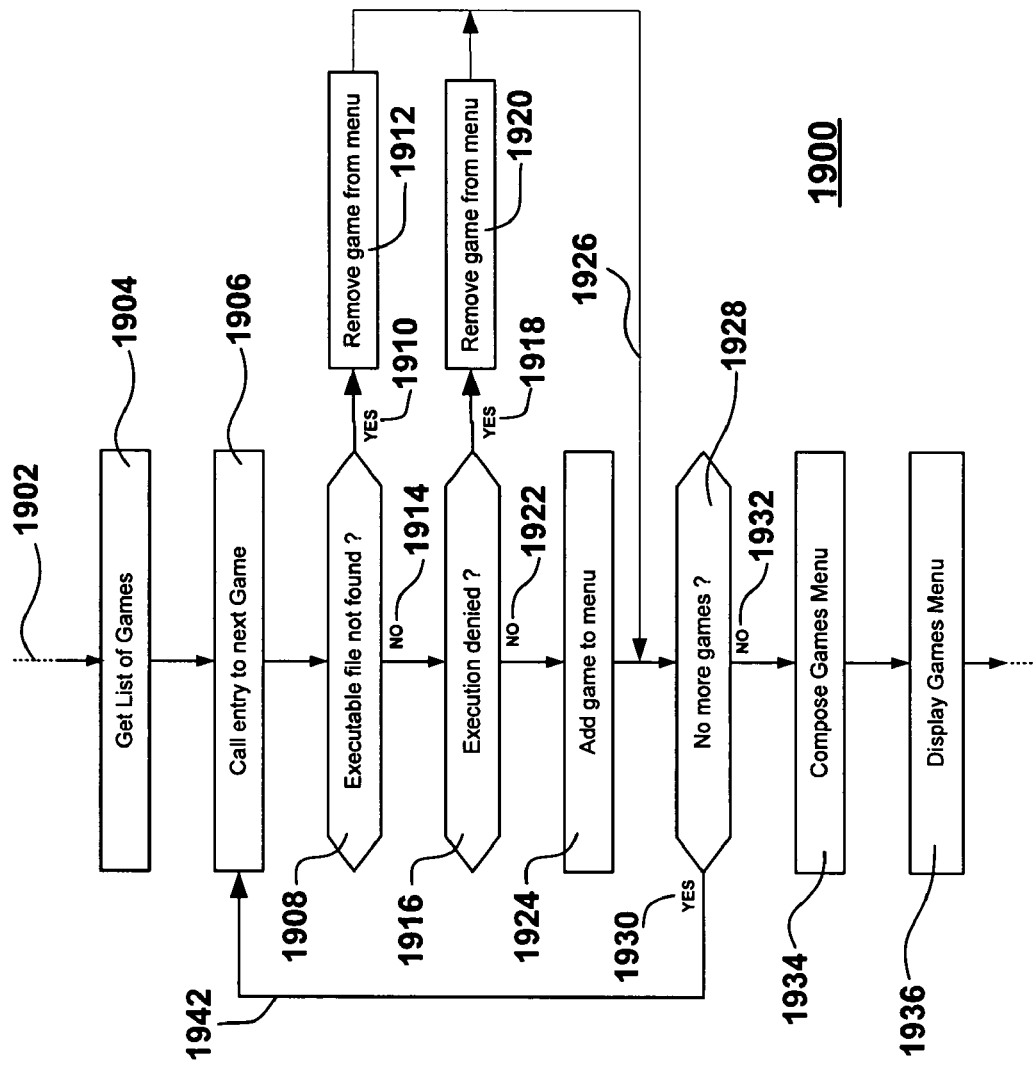
FIG. 19 illustrates the method to generate dynamically the menu list of authorized game made available to the player on each gaming terminal, according to an embodiment of the present invention.

FIG. 19 at 1900 illustrates a method to generate dynamically the menu list of authorized games made available to the player on each gaming terminal, according to an embodiment of the present invention. The dynamic configuration of a large gaming system whereby authorized games made available to players on selected group of gaming terminals using software restrictions policies at the central system may result is hundreds of different game menus. Reliance on SRPs for preventing non-authorized software components to execute is entirely based on a sound and demonstrable trusted base; therefore the gaming system is trusted. Getting the list of authorized games to each gaming terminal would require configurations files to be sent from the central system to each of the gaming terminal; however, this would be illegal because the change in the list of games may affect the game outcome. This is clearly understandable when considering changing a game; let us say Infinity 95 with a RTP or 95% with Infinity_98 with a RTP of 98% at 10:00 PM, then back at 8:00 AM, and this each day except during the weekend, or at other times as a result of the closed loop process described at FIG. 18. Game regulators mandate that the process to manage this type of change be certified with secure means of the same order as when installing/downloading software components using a unique PKI method.

Embodiments of the present invention, therefore, provide secure means to update a list of authorized games to be offered to the player. The menu of authorized games offered to the player may be dynamically generated by each terminal without requiring the central system to dispatch the list of authorized games or having each terminal fetch the list of authorized games from the central system (both are illegal without extreme precaution of the same order as the installing/downloading of software components using a unique PKI method because they may affect the game outcome); this is achieved by having each terminal checking the certificate Software Restriction Policies enforced on the games (a unique PKI certificate being generated for each of the executable game components in accordance with the methods detailed in this document).

As illustrated in FIG. 19 at 1900, each terminal when executing the gaming application 1902 gets a list of the file names for the games available at 1904 from a trusted configuration file (an updated trusted configuration file may have been downloaded in a certified code signed MSI package with the last game download) and a menu is initially compiled for this list. Attempts to execute each of the game entry module of the games contained in the list 1906 are made. If the game entry module is not found at 1910, the software components do not exist on the gaming terminal and the game is removed from the menu 1912, whereupon the process iterates to next game, as suggested at 1926 1928. If the execution of the game entry module is denied at 1916, 1918 because the Software Restriction Policy is preventing this game to execute, the game is removed from the menu as shown at 1920 and the process iterates to next game, as shown at 1926 1928. If the execution of the game entry module is successful at 1922, then the game is authorized and may be added to the games menu offered to the player. The process iterates through other games in the list, as shown at 1928, 1930, 1942, 1906, if any. Once the iteration is completed at 1932, the games menu may be composed at 1934 and the menu is displayed to the player at 1936.

FIG. 20 shows a companion Hello component, according to another aspect of the present invention. Reference numeral 2000 in FIG. 20 illustrates a method to generate a code signed companion software component. Each game comprises an aggregate of executable and non-executable software components, usually comprising files such as *.exe, *.dll, *.dat, *.xml. In general, all the software components are dependent of one component named the main program or the game entry. Starting the execution of the main game component is a lengthy process, as a large number of dependent executable components and graphics need to be verified (SRP verification) and started. Currently, there is no API available in the Windows operating system client computer for verifying the status of a Software Restriction Policy enforcement on a given software component applicable to that client computer.

Another embodiment of the present invention, therefore, provides a method to quickly verify the policy enforcement on a game without starting the entire game, in order to generate the list of available games to be made available to the player in a menu. For each game, a very short companion .dll file may be created having, for example, only one line of code<<Return "HELLO" >> which would return the exemplary "HELLO" string when called. Assuming "Infinity.dll" 2010 is the main game component file name 2002 (or friendly name), then the companion file may be named "Infinity.Hello.dll" 2018. Preferably, the companion's 2018 source code would have in its assembly information a part number 2004 as shown at 2020 and a version number 2006 as shown at 2022 that is identical to the main component 2010 part number 2012 and a version number 2014, but this is not mandatory. In addition, assuming the PKI certificate's subject name 2008 associated to the Infinity.dll is "GDS.exe.0099-0001-00 [1.0.101.0] Infinity.dll" 2016, which is used for the code signing of the Infinity.dll, we may proceed with the code signing of Infinity.Hello.dll with the same 2026, 2028 "GDS.exe.0099-0001-00[1.0.101.0] Infinity.dll" certificate, as shown at 2024.

It is to be noted that code signing two distinct software executables with the same certificate is a deviation from the method taught earlier in this document. However, the fact that the role of the companion file is very well defined, as having for example only one line of code<<Return "HELLO">> which would return the "HELLO" string when called, this does not present an issue with the regulators or the certification lab.

Figure 21:
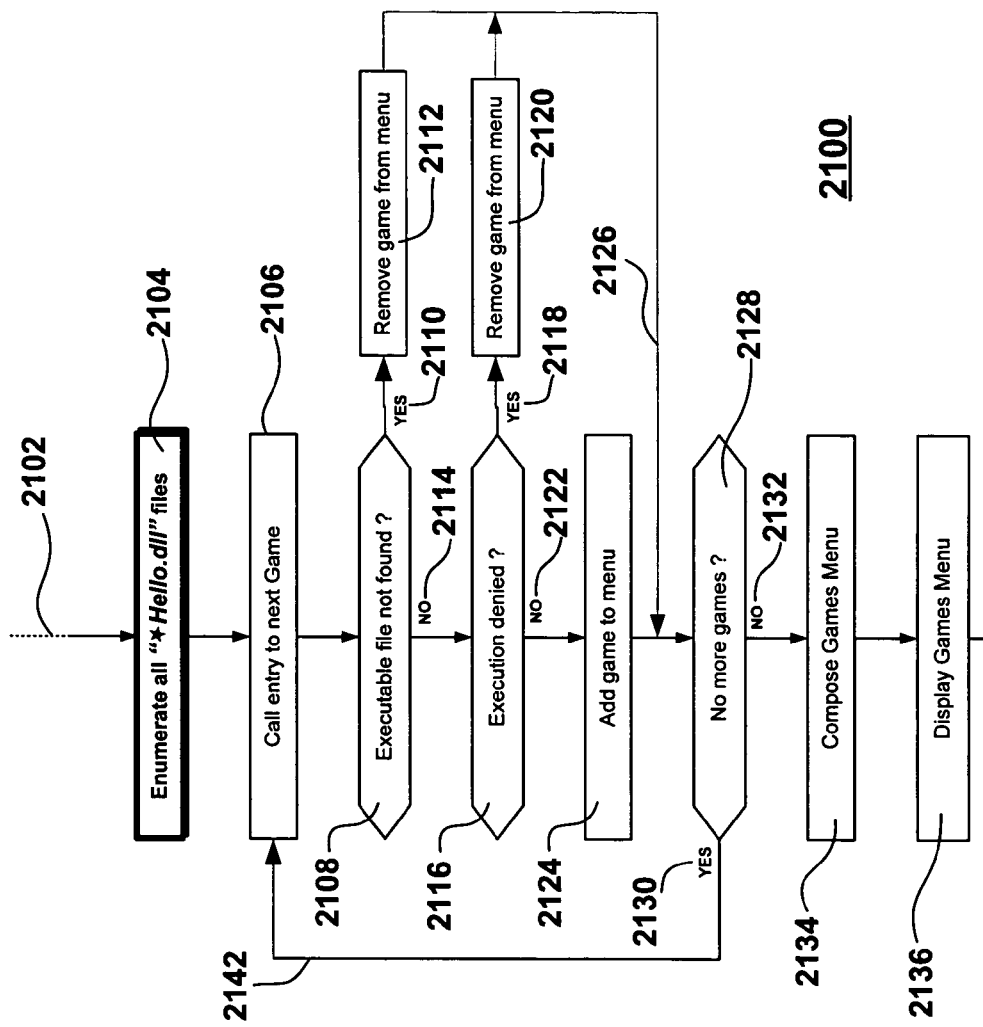
FIG. 21 illustrates the method to quickly generate dynamically the list of game installed on each gaming terminal using the companion software component, according to an embodiment of the present invention.

FIG. 21 shows steps that may be carried out to search for games on each gaming terminal, according to yet another embodiment of the present invention. Reference numeral 2100 in FIG. 21 illustrates a method to quickly generate dynamically the list of games installed on each gaming terminal using the companion software component described above. The process of dynamically generating the game selection menu may be optimized in many ways in order to reduce the overhead of starting the execution of a game to check if it is authorized. However, if the aim is to sense for the enforced SRP or SIP applied to the game or detect local availability of the game software components, then such optimizations (among other possible variations) should be considered to be within the scope of the invention as defined by the claims hereunder. According to an embodiment of the present invention, a method is presented herewith to quickly generate the list of available games to be made available to the player in a menu without transfer of a file from the server. Reference 2100 is identical to reference 1900 in FIG. 19 except for the first process 2104 whereby a file search process is performed for finding (or enumerating) file names with the "*Hello.dll" string, the "*" symbol being the standard wild character used in string searches. A list of the games installed on each gaming terminal may be quickly and dynamically generated by calling the companion software component of the game main component instead of calling the main component itself. The companion component may be as detailed at FIG. 20 or may be a similar construct.

The embodiments of the present invention described herein are also applicable to any of the subsystems available in a network connected gaming system that require preventing non-authorized software components to execute or affect game outcome, such as the gaming terminals, the game management system (CMS or MCS) that monitor and control whole or part of the estate of gaming machines, the progressive jackpot systems, the bonussing systems as well as game payment verification systems such as IGT EasyPay and Cyberview PVU (Payment Verification Unit) and PVS (Payment Verification System). Gaming subsystems are tested against gaming standards such as those produced by GLI (Game Laboratory International); the game standards are mandated by game regulators in accordance with local regulation and laws. The network-connected subsystems may be located within the premises accommodating the estate of gaming machines (connection via a LAN) or outside of the premises (connection via a WAN).

The methods described in the document rely on software installation policies and Software Restriction Policies which may be configured (a) via the domain controller active directory, as this is advantageously the case whenever the network connection is a LAN, and which may also be configured (b) to each of the local computers via WMI services (Windows Management Instrumentation) or administrative templates (.adm files) in order to configure and enforce local group policies when a domain controller is not available as this is the case whenever the network connection is a WAN. Microsoft SMS (Systems Management Server) may be used as an alternative to using software installation policies.

The methods described in the document leverage on software installation policies and/or software restriction policies technology implemented in Microsoft Windows operating system. Whenever similar technology is implemented in other operating systems such as Linux, Unix, Windows CE and QNX, it is considered as part of the invention herein.

In an other embodiment of the invention, it order to make game regulators more at ease with the huge shift in paradigm from prehensile physically secured ROM based gaming machines (whereby access to the ROM is via multiple layers of keys locks and tamper detectors), to a totally virtual or volatile fashion of downloading game code via a network, it may be advantageous to perform download of the game code when the gaming machine is not operational. Consequently, the network downloading of game code from a central repository may not interfere with the games. This is accomplish by terminating all gaming software in order to transform the gaming machine into a generic PC, then transferring the game software under the control of the operating system using pervasive network code download available in most information technology networked environments. An "Out-of-service" message may be displayed on the screen to indicate that the machine is no longer playable, thus is no longer a gaming machine. Once the game code is downloaded by the generic PC, the game code is verified for trustworthiness and is executed, thus transforming the generic PC back into a gaming machine.

What is claimed is:

1. A computer-implemented method for managing game source code for submission to a game certification laboratory, comprising the steps of:

selecting, in a first environment, the game source code and related files to be submitted to the game certification laboratory;

packaging the selected source code and the related files into an installation package, the packaging step including code signing the installation package with a distinct PKI certificate;

executing computer software to configure certificate rule policies to enable execution of the code signed installation package in the game certification laboratory;

executing computer software to configure enforcement of the certificate rule policies, and providing the code signed installation package to the game certification laboratory for installation within the game certification laboratory according to the configured certificate rule policies.

2. The computer-implemented method of claim 1, wherein the packaging step includes packaging a full location path of the selected source code and related files in the installation package.

3. The computer-implemented method of claim 1, wherein the related files include at least one of: compiling directives, make directives, build directives, Microsoft Visual Studio Project directives, MS Visual Studio Solution directives, Microsoft MSBuild directives Visual, Studio automation scripts, compiled source code code-signing directives and target deployment directives.

4. The computer-implemented method of claim 1, wherein the related files include at least one of: data files, configuration files, XML configuration files, game media assets, video assets, test utilities, command scripts, policy scripts, target system policy enforcement scripts and target system execution restriction policy directives.

5. The computer-implemented method of claim 1, wherein the installation package is code signed with a PKI certificate issued by a trusted certificate authority under the control of one of the manufacturer, the game certification laboratory, a game regulatory organization, a trusted third party, and VeriSign.

6. The computer-implemented method of claim 1, wherein the installation package contains installation custom actions.

7. The computer-implemented method of claim 6, wherein the custom actions are trusted when the package is code signed.

8. The computer-implemented method of claim 1, wherein the installation package contains installation custom actions that are operative to perform automation operations in the second environment during at least one of package installation and un-installation.

9. The computer-implemented method of claim 1, wherein the method further includes a step of executing the installation package to unpack and install the selected source code and the related files into the second environment within the game certification laboratory.

10. The computer-implemented method of claim 1, wherein the first environment includes an integrated software development environment (IDE).

11. The computer-implemented method of claim 10, wherein the integrated software development environment includes MS-Visual Studio.

12. The computer-implemented method of claim 1, wherein the second environment includes an integrated software development environment (IDE).

13. The computer-implemented method of claim 12, wherein the integrated software development environment includes MS-Visual Studio.

14. The computer-implemented method of claim 1, wherein the installation package in the providing step is a Microsoft Installer Package (MSI).

15. The computer-implemented method of claim 1, wherein the packaging step includes embedding within the installation package attributes at least one of a global unique identifier (GUID), a package file name identifier, a manufacturer identifier, a customer identifier, an applicable regulation identifier, a submission identifier, a part number identifier, a version identifier, a patch sequence identifier, and a regulatory variant identifier.

16. The computer-implemented method of claim 1, wherein the game certification laboratory is configured to check the identification details of the installed source code by viewing an "Add or Remove Programs" utility, including the installed source code patches when a "Show Updates" option is selected.

17. The computer-implemented method of claim 1, further including a step of removing installed source code from the second environment by selecting a corresponding "Remove" button in an "Add or Remove Programs" utility.

18. The computer-implemented method of claim 1, further including a step of removing an installed source code update or patch sequence from the second environment by selecting a "Show Updates" option and by selecting a remove button in an "Add or Remove Programs" utility.

19. The computer-implemented method of claim 1, further including a step of removing source code, a source code update or a patch sequence from the second environment by selecting a corresponding option in an installer console program having a format "msiexec.dll/x {package}".

20. The computer-implemented method of claim 1, wherein the installation package contains shortcut definitions for adding shortcuts in the second environment during the package installation for automating the source code certification process.

21. The computer-implemented method of claim 1, wherein the providing step includes providing the installation package in one of a CD-ROM, a movable media, an encrypted movable media, an email, an encrypted email, via VPN, and via encrypted Internet download.

22. The computer-implemented method of claim 1, wherein the source code of the second environment is maintained synchronized with the source code of the first environment via the submission of the installation package.

23. The computer-implemented method of claim 1, wherein the source code and the related files of the second environment are maintained synchronized with the source code and the related files of the first environment via the submission of the installation package.

24. The computer-implemented method of claim 5, wherein the certificate is generated by the certificate authority under control of one of the manufacturer, the game certification lab, a game regulatory organization, a trusted third party, and VeriSign.

25. A machine-readable storage medium having data stored thereon representing sequences of instructions which, when executed by a computer, causes the computer to carry out a method of managing game source code and related files for submission to game certification laboratory, by carrying out steps of:

selecting, in a first environment, the game source code and related files to be submitted to the game certification laboratory;

packaging the selected source code and the related files into an installation package, the packaging step including code signing the installation package with a distinct PKI certificate;

configuring certificate rule policies to enable execution of the code signed installation package in the game certification laboratory;

configuring enforcement of the certificate rule policies, and providing the code signed installation package to the game certification laboratory for installation within the game certification laboratory according to the configured certificate rule policies.

26. The machine-readable storage medium of claim 25, wherein the packaging step includes packaging a full location path of the selected source code and related files in the installation package.

27. The machine-readable storage medium of claim 25, wherein the related files include at least one of compiling directives, make directives, build directives, Microsoft Visual Studio Project directives, MS Visual Studio Solution directives, Microsoft MSBuild directives Visual, Studio automation scripts, compiled source code code-signing directives and target deployment directives.

28. The machine-readable storage medium of claim 25, wherein the related files include at least one of data files, configuration files, XML configuration files, game media assets, video assets, test utilities, command scripts, policy scripts, target system policy enforcement scripts and target system execution restriction policy directives.

29. The machine-readable storage medium of claim 25, wherein the installation package is code signed with a PKI certificate issued by a trusted certificate authority.

30. The machine-readable storage medium of claim 25, wherein the installation package contains installation custom actions.

31. The machine-readable storage medium of claim 30, wherein the custom actions are trusted when the package is code signed.

32. The machine-readable storage medium of claim 25, wherein the installation package contains installation custom actions that are operative to perform automation operations in the second environment during at least one of package installation and un-installation.

33. The machine-readable medium of claim 25, wherein the method further includes a step of executing the installation package to unpack and install the selected source code and the related files into the second environment within the game certification laboratory.

34. The machine-readable storage medium of claim 25, wherein the first environment includes an integrated software development environment (IDE).

35. The machine-readable storage medium of claim 34, wherein the integrated software development environment includes MS-Visual Studio.

36. The machine-readable storage medium of claim 25, wherein the second environment includes an integrated software development environment (IDE).

37. The machine-readable storage medium of claim 36, wherein the integrated software development environment includes MS-Visual Studio.

38. The machine-readable storage medium of claim 25, wherein the installation package in the providing step includes a Microsoft Installer Package (MSI).

39. The machine-readable storage medium of claim 25, wherein the packaging step includes embedding within the installation package attributes of at least one of a global unique identifier (GUID), a package file name identifier, a manufacturer identifier, a customer identifier, an applicable regulation identifier, a submission identifier, a part number identifier, a version identifier, a patch sequence identifier, and a regulatory variant identifier.

40. The machine-readable storage medium of claim 25, wherein the game certification laboratory is configured to check the identification details of the installed source code by viewing an "Add or Remove Programs" utility, including the installed source code patches when a "Show Updates" option is selected.

41. The machine-readable storage medium of claim 25, further including a step of removing installed source code from the second environment by selecting a corresponding "Remove" button in an "Add or Remove Programs" utility.

42. The machine-readable storage medium of claim 25, further including a step of removing an installed source code update or patch sequence from the second environment by selecting a "Show Updates" option and by selecting a remove button in an "Add or Remove Programs" utility.

43. The machine-readable storage medium of claim 25, further including a step of removing source code, a source code update or a patch sequence from the second environment by selecting a corresponding option in an installer console program having a format "msiexec.dll/x {package}".

44. The machine-readable storage medium of claim 25, wherein the installation package contains shortcut definitions for adding shortcuts in the second environment during the package installation for automating the source code certification process.

45. The machine-readable storage medium of claim 25, wherein the providing step includes providing the installation package in one of a CD-ROM, a movable media, an encrypted movable media, an email, an encrypted email, via VPN, and via encrypted Internet download.

46. The machine-readable storage medium of claim 25, wherein the source code of the second environment is maintained synchronized with the source code of the first environment via the submission of the installation package.

47. The machine-readable storage medium of claim 25, wherein the source code and the related files of the second environment are maintained synchronized with the source code and the related files of the first environment via the submission of the installation package.

48. The machine-readable storage medium of claim 29, wherein the certificate is generated by the certificate authority under control of one of the manufacturer, the game certification lab, a game regulatory organization, a trusted third party, and VeriSign.

49. An automated platform to enable regulatory certification of game software components, comprising:
 a hardware-containing reference platform representative of a target network of gaming systems and comprising a software-building environment located at a premise of a manufacturer of the game software components;
 a hardware-containing certification platform located at a regulatory certification authority, the certification platform being substantially identical to the reference platform, and
 installation package generating means for generating at least one installation package that includes the game software components for which the regulatory certification is sought, the installation package generating means being configured to code sign the installation package with a distinct PKI certificate, the reference platform being configured to configure and enforce certificate rule policies to enable execution of the code signed installation package in the certification platform, and the code signed installation package being configured to execute to install the game software components within the certification platform according to the configured certificate rule policies.

50. The automated platform of claim 49, wherein the installation package includes a full location path of the game software components.

51. The automated platform of claim 49, wherein the related files include at least one of compiling directives, make directives, build directives, Microsoft Visual Studio Project directives, MS Visual Studio Solution directives, Microsoft MSBuild directives Visual, Studio automation scripts, compiled source code, code-signing directives and target deployment directives.

52. The automated platform of claim 49, wherein the related files include at least one of data files, configuration files, XML configuration files, game media assets, video assets, test utilities, command scripts, policy scripts, target system policy enforcement scripts and target system execution restriction policy directives.

53. The automated platform of claim 49, wherein the installation package is code signed with a PKI certificate issued by a trusted certificate authority under the control of a selected one of the manufacturer of the software components, of a game certification laboratory, of the regulatory certification authority, of a trusted third party, and of VeriSign.

54. The automated platform of claim 49, wherein the installation package contains installation custom actions.

55. The automated platform of claim 54, wherein the custom actions are trusted when the package is code signed.

56. The automated platform of claim 49, wherein the installation package contains installation custom actions for performing automation operations in the certification platform during at least one of package installation and un-installation.

57. The automated platform of claim 49, wherein the installation package is configured to be executed to unpack and install the game software components within the certification platform.

58. The automated platform of claim 49, wherein the software building environment includes an integrated software development environment (IDE).

59. The automated platform of claim 58, wherein the integrated software development environment includes MS-Visual Studio.

60. The automated platform of claim 49, wherein the certification platform includes an integrated software development environment (IDE).

61. The automated platform of claim 60, wherein the integrated software development environment includes MS-Visual Studio.

62. The automated platform of claim 49, wherein the installation package includes a Microsoft Installer Package (MSI).

63. The automated platform of claim 49, wherein the installation package includes attributes of at least one of a global unique identifier (GUID), a package file name identifier, a manufacturer identifier, a customer identifier, an applicable regulation identifier, a submission identifier, a part number identifier, a version identifier, a patch sequence identifier, and a regulatory variant identifier.

64. The automated platform of claim 49, wherein the installation package is configured such that the certification platform is able to check the identification details of the software components by viewing the "Add or Remove Programs" utility, including any installed source code patches when the "Show Updates" option is selected.

65. The automated platform of claim 49, wherein the installation package is configured such that the certification platform is able to remove the software components by selecting a "Remove" button in a "Add or Remove Programs" utility.

66. The automated platform of claim 49, wherein the installation package is configured such that the certification platform, when a "Show Updates" option is selected, is able to remove the software components by selecting a "Remove" button in an "Add or Remove Programs" utility.

67. The automated platform of claim 49, wherein the software components include a source code, source code update or patch sequence and wherein the installation package is configured such that the certification platform is able to remove the source code, source code update or patch sequence by selecting an option in an installer console program having a format "msiexec.dll /x {package}".

68. The automated platform of claim 49, wherein the installation package contains shortcut definitions for adding shortcuts in the certification platform during the package installation for automating the source code certification process.

69. The automated platform of claim 49, wherein the providing step includes providing the installation package in one of a CD-ROM, an movable media, an encrypted movable media, an email, an encrypted email, via VPN, and via encrypted Internet download.

70. The automated platform of claim 49, wherein the software components include a source code and wherein the software components of the certification platform is maintained synchronized with the source code of the software-building environment via the submission of the installation package.

71. The automated platform of claim 49, wherein the software components of the certification platform are maintained synchronized with the software components of the software-building environment via the submission of the installation package.

72. The automated platform of claim 53, wherein the certificate is generated by the certificate authority under control of a selected one of the manufacturer of the software components, of a game certification laboratory, of the regulatory certification authority, of a trusted third party and of VeriSign.

73. A computer-implemented method for synchronizing game source code and related files between a software development environment of a game certification laboratory and a software development environment of a game manufacturer, comprising steps of:
selecting, in the game manufacturer's software development environment, the source code and related files to be submitted to the game certification laboratory;
packaging the selected source code and the related files into an installation package that is code signed with a distinct PKI certificate, and
executing computer software to configure certificate rule policies to enable execution of the code signed installation package in the game certification laboratory;
executing computer software to configure configuring enforcement of the certificate rule policies, and
providing the code signed installation package to the game certification laboratory for installation in file software development environment of the game certification laboratory according to the configured certificate rule policies.

74. The computer-implemented method of claim 73, wherein the packaging step includes packaging a full location path of the selected source code and related files in the installation package.

75. The computer-implemented method of claim 73, wherein the related files include at least one of: compiling directives, make directives, build directives, Microsoft Visual Studio Project directives, MS Visual Studio Solution directives, Microsoft MSBuild directives Visual, Studio automation scripts, compiled source code code-signing directives and target deployment directives.

76. The computer-implemented method of claim 73, wherein the related files include at least one of: data files, configuration files, XML configuration files, game media assets, video assets, test utilities, command scripts, policy scripts, target system policy enforcement scripts and target system execution restriction policy directives.

77. The computer-implemented method of claim 73, wherein the installation package is code signed with a PKI certificate issued by a trusted certificate authority under the control of one of the manufacturer, the game certification laboratory, a game regulatory organization, a trusted third party, and VeriSign.

78. The computer-implemented method of claim 73, wherein the installation package contains installation custom actions.

79. The computer-implemented method of claim 78, wherein the custom actions are trusted when the package is code signed.

80. The computer-implemented method of claim 73, wherein the installation package contains installation custom actions that are operative to perform automation operations in the software development environment of the game certification laboratory during at least one of package installation and un-installation.

81. The computer-implemented method of claim 73, further including a step of executing the installation package to unpack and install the selected source code and the related files into the software development environment of the game certification laboratory.

82. The computer-implemented method of claim 73, wherein the software development environment of the game manufacturer includes an integrated software development environment (IDE).

83. The computer-implemented method of claim 82, wherein the integrated software development environment of the game manufacturer includes MS-Visual Studio.

84. The computer-implemented method of claim 73, wherein the software development environment of the game certification laboratory includes an integrated software development environment (IDE).

85. The computer-implemented method of claim 84, wherein the integrated software development environment of the game certification laboratory includes MS-Visual Studio.

86. The computer-implemented method of claim 73, wherein the installation package in the providing step includes a Microsoft Installer Package (MSI).

87. The computer-implemented method of claim 73, wherein the packaging step includes embedding within the installation package attributes at least one of a global unique identifier (GUID), a package file name identifier, a manufacturer identifier, a customer identifier, an applicable regulation identifier, a submission identifier, a part number identifier, a version identifier, a patch sequence identifier, and a regulatory variant identifier.

88. The computer-implemented method of claim 73, wherein the game certification laboratory is configured to check the identification details of the installed source code by viewing an "Add or Remove Programs" utility, including the installed source code patches when a "Show Updates" option is selected.

89. The computer-implemented method of claim 73, further including a step of removing installed source code from the software development environment of the game certification laboratory by selecting a corresponding "Remove" button in an "Add or Remove Programs" utility.

90. The computer-implemented method of claim 73, further including a step of removing an installed source code update or patch sequence from the software development environment of the game certification laboratory by selecting a "Show Updates" option and by selecting a remove button in an "Add or Remove Programs" utility.

91. The computer-implemented method of claim 73, further including a step of removing source code, a source code update or a patch sequence from the software development environment of the game certification laboratory by selecting a corresponding option in an installer console program having a format "msiexec.dll /x {package}".

92. The computer-implemented method of claim 73, wherein the installation package contains shortcut definitions for adding shortcuts in the software development environment of the game certification laboratory during the package installation for automating the source code certification process.

93. The computer-implemented method of claim 73, wherein the providing step includes providing the installation package in one of a CD-ROM, a movable media, an encrypted movable media, an email, an encrypted email, via VPN, and via encrypted Internet download.

94. The computer-implemented method of claim 73, wherein the source code of the software development environment of the game certification laboratory is maintained synchronized with the source code of the software development environment of the game manufacturer via the submission of the installation package.

95. The computer-implemented method of claim 73, wherein the source code and the related files of the second environment are maintained synchronized with the source code and the related files of the first environment via the submission of the installation package.

96. The computer-implemented method of claim 77, wherein the certificate is generated by the certificate authority under control of one of the manufacturer, the game certification lab, a game regulatory organization, a trusted third party, and VeriSign.

* * * * *